US011327332B2

(12) United States Patent
Lamontagne et al.

(10) Patent No.: US 11,327,332 B2
(45) Date of Patent: May 10, 2022

(54) REPEATABLE PRECISION MOUNTING OF MECHANICAL PARTS

(71) Applicant: INSTITUT NATIONAL D'OPTIQUE, Québec (CA)

(72) Inventors: Frédéric Lamontagne, Québec (CA); Nichola Desnoyers, Québec (CA)

(73) Assignee: INSTITUT NATIONAL D'OPTIQUE, Québec (CA)

( * ) Notice: Subject to any disclaimer, the term of this patent is extended or adjusted under 35 U.S.C. 154(b) by 0 days.

(21) Appl. No.: 17/091,503

(22) Filed: Nov. 6, 2020

(65) Prior Publication Data
US 2021/0132405 A1    May 6, 2021

Related U.S. Application Data

(60) Provisional application No. 62/931,474, filed on Nov. 6, 2019.

(51) Int. Cl.
*G01B 5/25* (2006.01)
*G02B 27/62* (2006.01)

(52) U.S. Cl.
CPC ........... *G02B 27/62* (2013.01); *G01B 5/25* (2013.01)

(58) Field of Classification Search
CPC ......... G02B 27/62; G01B 5/25; B23Q 16/021
See application file for complete search history.

(56) References Cited

U.S. PATENT DOCUMENTS

| | | | | | |
|---|---|---|---|---|---|
| 5,695,297 | A | * | 12/1997 | Geib | F16B 7/149 403/369 |
| 6,900,952 | B2 | * | 5/2005 | Eisenbies | G02B 7/1824 359/813 |
| 6,940,891 | B2 | * | 9/2005 | Clary | G02B 7/003 372/107 |
| 7,088,530 | B1 | * | 8/2006 | Recco | G02B 13/0035 359/811 |
| 7,365,925 | B2 | * | 4/2008 | Wayne | G02B 27/62 359/811 |

(Continued)

OTHER PUBLICATIONS

Fellowes, David "Kinematic and Quasi-Kinematic Constraints: What They Are & How They Work", Tutorial on Kinematic Constraints, p. 1 to 8, Dec. 11, 2006.

(Continued)

*Primary Examiner* — Yaritza Guadalupe-McCall
(74) *Attorney, Agent, or Firm* — Dinsmore & Shohl LLP

(57) ABSTRACT

Assemblies and kits providing the repeatable positioning of a removable component with respect to a reference component are provided. Precision positioning members including a threaded positioning shaft associated with the reference component, a positioning sleeve associated with the removable component and an alignment nut screwed in the positioning shaft and abutting the positioning sleeve are provided. The spatial profile abutments on the positioning sleeve or positioning nut and the thread angle of the positioning shaft threads are selected to provide an automatic alignment of the positioning shaft within the positioning sleeve. A clocking angle lock for locking the relative orientation of the reference component and removable component is also provide, preferably in the shape of precision clocking members. Assemblies including three sets of precision members with slotted sleeves are also provided.

26 Claims, 21 Drawing Sheets

(56) References Cited

U.S. PATENT DOCUMENTS

| | | | |
|---|---|---|---|
| 9,939,604 B2* | 4/2018 | Lamontagne | G02B 7/026 |
| 2005/0089364 A1* | 4/2005 | Geib | F16D 1/093 |
| | | | 403/370 |
| 2005/0129459 A1* | 6/2005 | Doubler | F16B 35/005 |
| | | | 403/315 |
| 2015/0330434 A1* | 11/2015 | Stjernstedt | B23B 31/008 |
| | | | 403/320 |
| 2021/0132405 A1* | 5/2021 | Lamontagne | B23Q 16/021 |

OTHER PUBLICATIONS

Slocum, Alexander "Design of three-groove kinematic couplings", Precision Engineering, pp. 67 to 76; Apr. 1992, vol. 14 No 2.

\* cited by examiner

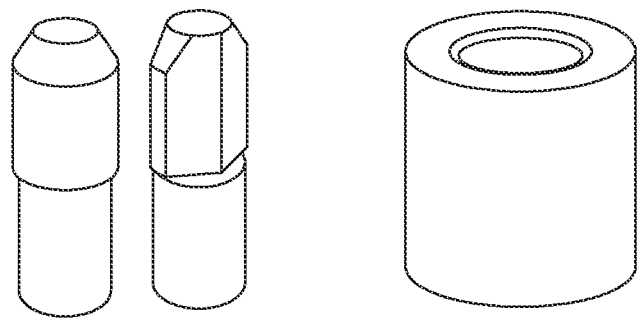
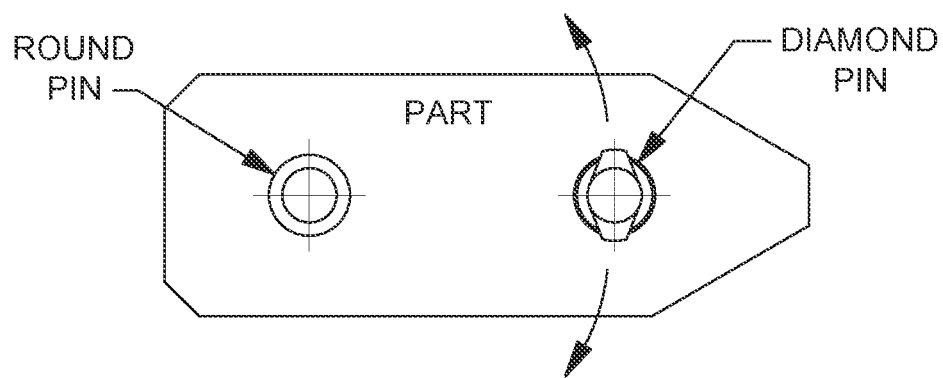
FIG. 1
(PRIOR ART)
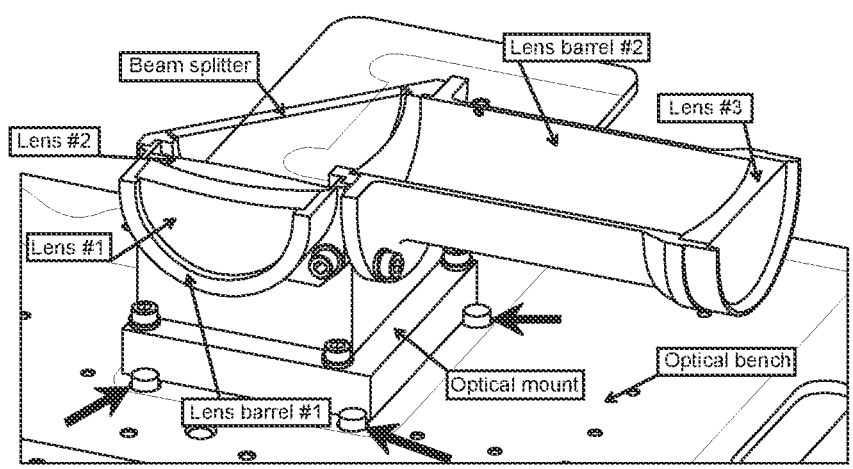
FIG. 2
(PRIOR ART)

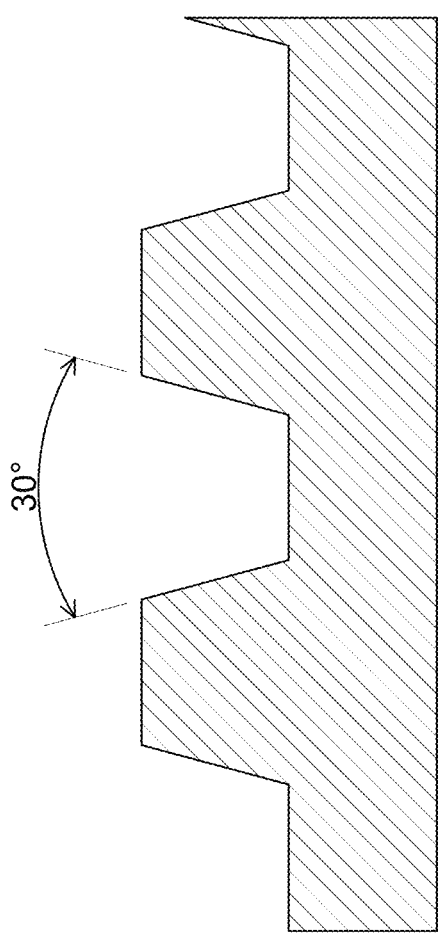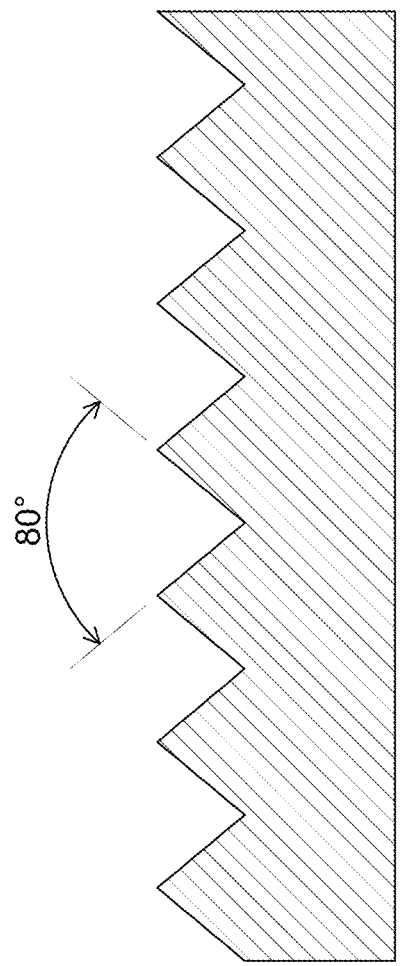

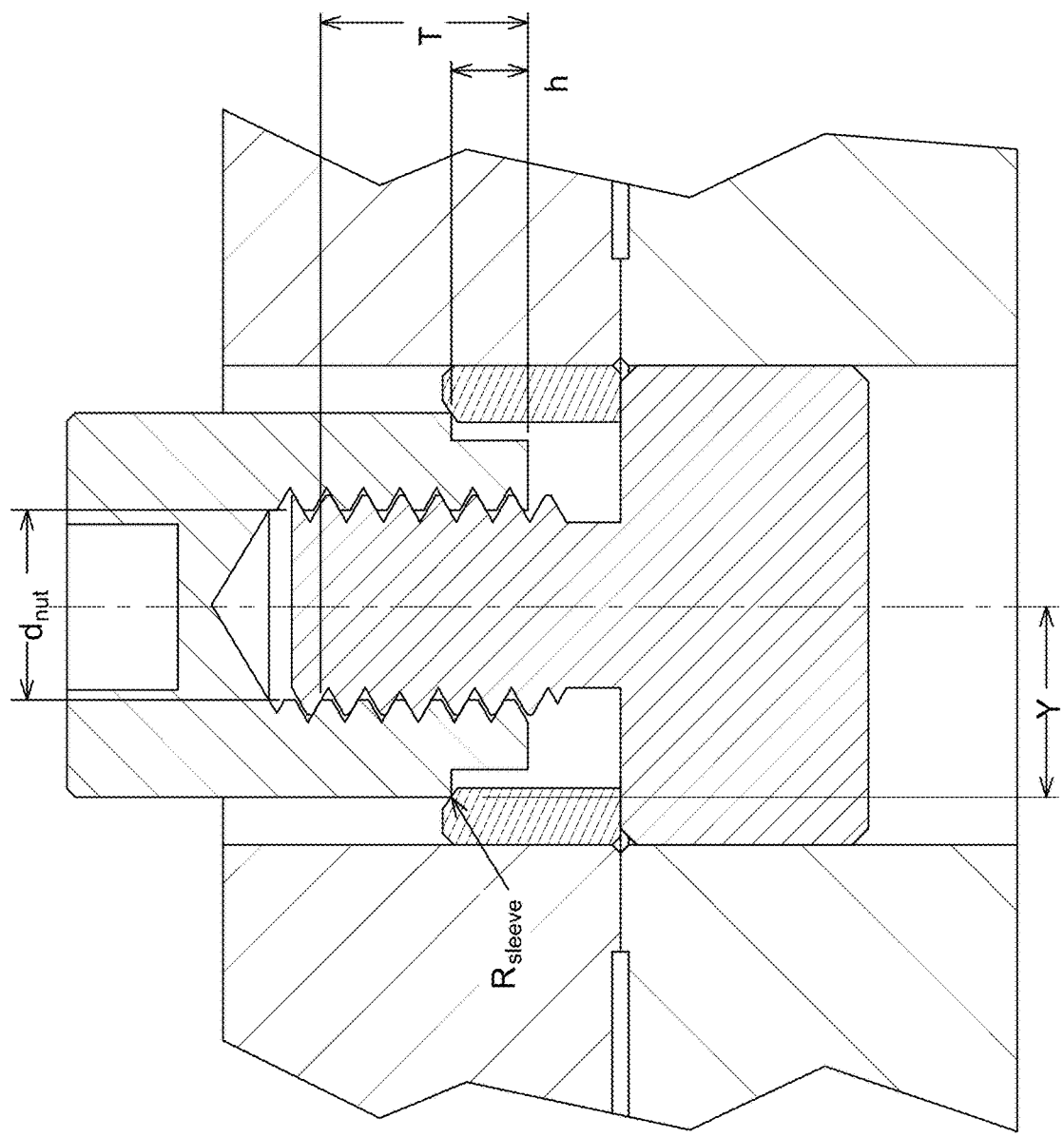

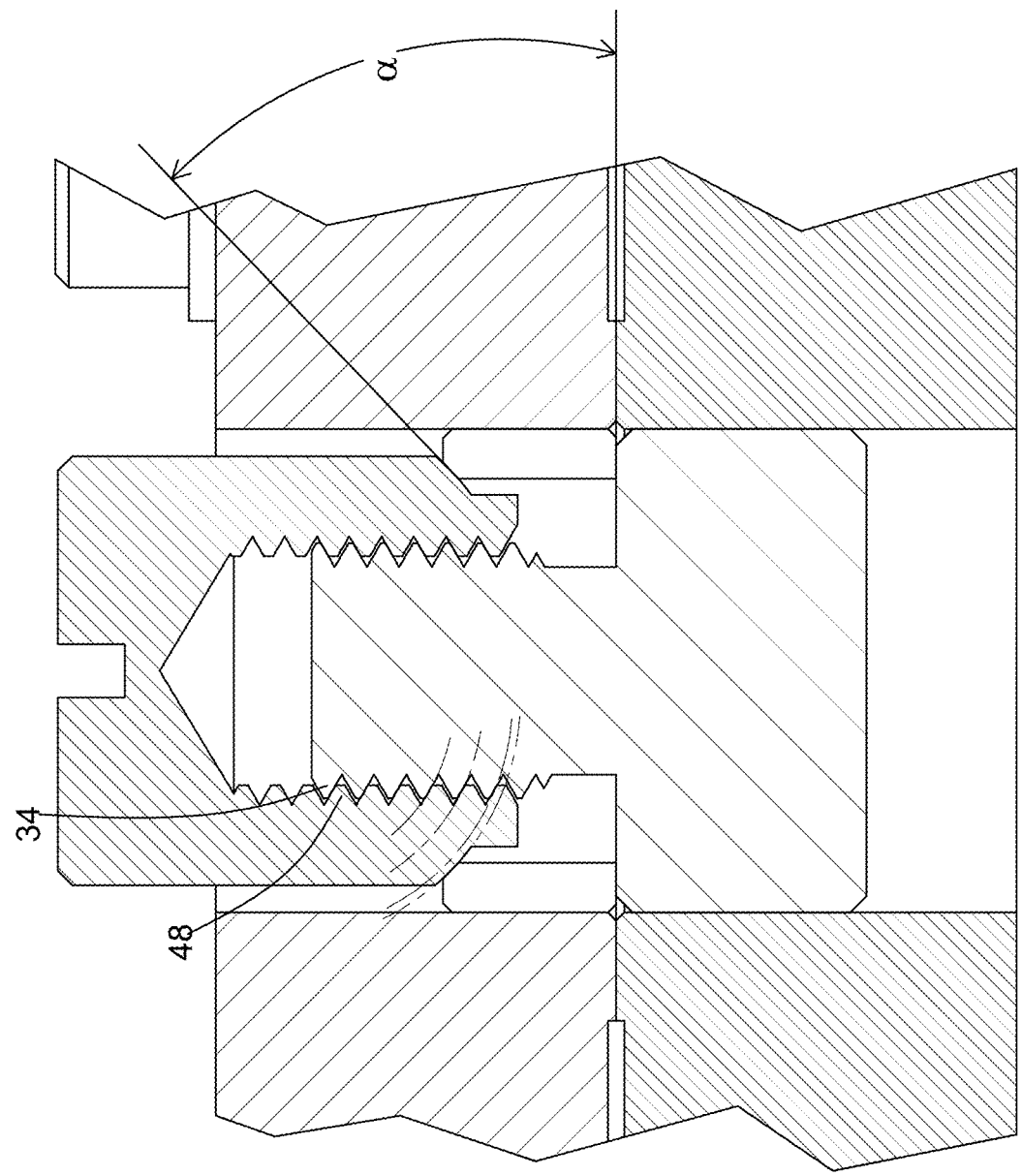

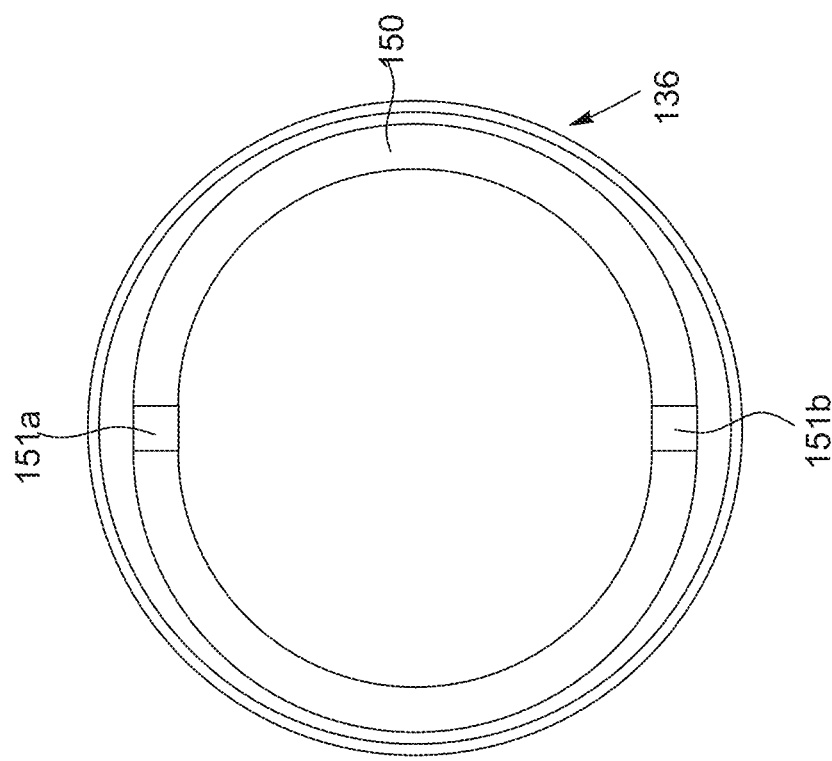

REPEATABLE PRECISION MOUNTING OF MECHANICAL PARTS

TECHNICAL FIELD

The technical field generally relates to mechanical and opto-mechanical assemblies and more particularly concerns assemblies allowing the repeatable precision mounting of mechanical parts.

BACKGROUND

High precision mechanical systems often require the ability to mount and dismount a subassembly of an assembly with good repeatability. This is particularly the case for opto-mechanical assemblies involving precise alignment of components. For example, if an optical sub-module has been aligned on an optical bench and needs to be removed for maintenance, it would be advantageous to have a repeatable positioning mechanism allowing to reinstall the sub-module on the bench at exactly the same position. This would avoid having to realign the entire system.

Referring to FIG. 1 (PRIOR ART, see https://www.carrlane.com/en-us/product/locators/locating-pins), it is known in the art to position optical components using cylindrical pins inserted into precision holes. However, a minimal play is required between the pins and the locating holes to ensure their assembly. This play diminishes the precision of the alignment, which is further impacted by manufacturing tolerances.

Referring to FIG. 2 (PRIOR ART, see https://doi.org/10.1117/12.2001699), it is also known in the art to use localizing stoppers, for example positioned on an optical bench to frame the desired position of an optical component. It can however be very difficult to guarantee proper contact with the stoppers in cases where the optical component needs to be secured with screws or the like.

There remains a need for a solution to the repeatable precision alignment of mechanical and opto-mechanical components which alleviates at least some of the above drawbacks.

SUMMARY

In accordance with one aspect, there is provided an assembly, comprising a reference component and a removable component. The removable component has a positioning hole therethrough and is removably assembled with the reference component at a target relative position.

The assembly further includes a set of precision positioning members providing a repeatable positioning of the removable component at the target relative position, comprising:
- a positioning shaft projecting from the reference component and provided with positioning shaft threads;
- a positioning sleeve extending within the positioning hole of the removable component and receiving the positioning shaft therethrough, the positioning sleeve defining an abutment; and
- an alignment nut having alignment nut threads complementary with the positioning shaft threads, the alignment nut being threadedly engaged with the positioning shaft and having an abutment engaging the abutment of the positioning sleeve.

A spatial profile of at least one of the abutments and a thread angle of the positioning shaft threads are selected to provide an automatic alignment of the positioning shaft within the positioning sleeve.

The assembly further includes a clocking angle lock for locking a relative orientation of the reference component and removable component about said positioning shaft.

In some implementations, the spatial profile of the at least one of the abutments is a frustro-spherical profile defined by a radius of curvature R of the corresponding abutment, said radius of curvature meeting an auto-alignment condition defined by the equation:

$$R = \sqrt{\left[\frac{d_{nut}}{2\tan(\varphi_{threads}/2)} - h - T/2\right]^2 + Y^2}$$

where:
- $d_{nut}$ is a diameter of the alignment nut along the alignment nut threads;
- $\varphi_{thread}$ is a value of the thread angle of the positioning shaft threads;
- Y is a half-diameter of a contact line between the abutments of the positioning sleeve and the alignment nut;
- h is a longitudinal distance between (i) a first point of contact of the alignment nut threads with the positioning shaft threads proximate to the abutments of the positioning sleeve and alignment nut and (ii) a point of contact of the abutment of the positioning sleeve with the abutment of the alignment nut; and
- T is a distance between (i) the first point of contact of the alignment nut threads with the positioning shaft threads proximate to the abutments of the positioning sleeve and the alignment nut and (ii) a last point of contact of the alignment nut threads with the positioning shaft threads farthest from the positioning sleeve and diametrically opposite to the first point of contact.

In other implementations, the spatial profile of one of the abutments is a frustro-conical profile defined by an inclination angle α of the corresponding abutment with respect to a transversal plane, said inclination angle meeting an auto-alignment condition defined by the equation:

$$\alpha = \sin^{-1}\left(\frac{Y}{\sqrt{\left[\frac{d_{nut}}{2\tan(\varphi_{threads}/2)} - h - T/2\right]^2 + Y^2}}\right)$$

where:
- Y is a half-diameter of a contact line between the abutments of the positioning sleeve and the alignment nut;
- $d_{nut}$ is a diameter of the alignment nut along the alignment nut threads;
- $\varphi_{thread}$ is a value of the thread angle of the positioning shaft threads;
- h is a longitudinal distance between (i) a first point of contact of the alignment nut threads with the positioning shaft threads proximate to the abutments of the positioning sleeve and alignment nut and (ii) a point of contact of the abutment of the positioning sleeve with the abutment of the alignment nut; and
- T is a distance between (i) the first point of contact of the alignment nut threads with the positioning shaft threads proximate to the abutments of the positioning sleeve and the alignment nut and (ii) a last point of contact of the alignment nut threads with the positioning shaft threads farthest from the positioning sleeve and diametrically opposite to the first point of contact.

In some implementations, the abutment of the positioning sleeve has said spatial profile providing an automatic alignment of the positioning shaft within the positioning sleeve.

In some implementations, the abutment of the alignment nut has said spatial profile providing an automatic alignment of the positioning shaft within the positioning sleeve.

In some implementations, the reference component comprises a positioning hole therethrough, and the set of precision positioning members comprises a positioning stud including a cylindrical base rigidly affixed within the positioning hole of the reference component, the positioning stud further comprising said positioning shaft projecting concentrically from the cylindrical base.

In some implementations, the positioning shaft projects integrally from the reference component.

In some implementations, the positioning shaft comprises a threaded base screwed into the reference component.

In some implementations, the positioning sleeve is rigidly affixed within the positioning hole of the removable component.

In some implementations, the positioning sleeve is an integral part of the removable component.

In some implementations, the removable component comprises a clocking hole therethrough, the clocking angle lock comprising a set of clocking members provided in conjunction with the clocking hole, the set of clocking members comprising:
a clocking shaft projecting from the reference component and provided with clocking shaft threads;
a slotted sleeve extending within the clocking hole of the removable component and receiving the clocking shaft therethrough, the slotted sleeve having a non-circular surface within a plane perpendicular to a center axis thereof and defining two opposite contact points; and
a clocking nut having clocking nut threads complementary with the clocking shaft threads, the clocking nut being threadably engaged with the clocking shaft and including an abutment engaging the non-circular surface of the slotted sleeve at said two opposite contact points;
wherein a thread angle of the clocking shaft threads and a spatial profile of at least one of the non-circular surface of the slotted sleeve at said opposite contact points and the abutment of the clocking nut provide an automatic alignment of the clocking shaft within the slotted sleeve.

In some implementations, the spatial profile of the at least one of the non-circular surface of the slotted sleeve at said opposite contact points and the abutment of the clocking nut is a frustro-spherical profile defined by a radius of curvature R', said radius of curvature meeting an auto-alignment condition defined by the equation:

$$R' = \sqrt{\left[\frac{d'_{nut}}{2\tan(\varphi'_{threads}/2)} - h' - T'/2\right]^2 + Y'^2}$$

where:
$D'_{nut}$ is a diameter of the clocking nut along the clocking nut threads;
$\varphi'_{thread}$ is a value of the thread angle of the clocking shaft threads;

Y' is a half-diameter of a contact line between the non-circular surface of the slotted sleeve and the abutment of the clocking nut;
H' is a longitudinal distance between (i) a first point of contact of the clocking nut threads with the clocking shaft threads proximate to the engagement of the slotted sleeve and clocking nut and (ii) a point of contact of the non-circular surface of the slotted sleeve with the abutment of the clocking nut; and
T' is a distance between (i) the first point of contact of the clocking nut threads with the clocking shaft threads proximate to the engagement of the slotted sleeve and the clocking nut and (ii) a last point of contact of the clocking nut threads with the clocking shaft threads farthest from the slotted sleeve and diametrically opposite to the first point of contact.

In some implementations, the spatial profile of the at least one of the non-circular surface of the slotted sleeve at said opposite contact points and the abutment of the clocking nut is a frustro-conical profile defined by an inclination angle α' with respect to a transversal plane, said inclination angle meeting an auto-alignment condition defined by the equation:

$$\alpha' = \sin^{-1}\left(\frac{Y'}{\sqrt{\left[\frac{d'_{nut}}{2\tan(\varphi'_{threads}/2)} - h' - T'/2\right]^2 + Y'^2}}\right)$$

where:
Y' is a half-diameter of a contact line between the slotted sleeve and the clocking nut;
$d'_{nut}$ is a diameter of the clocking nut along the clocking nut threads;
$\varphi'_{thread}$ is a value of the thread angle of the clocking shaft threads;
h' is a longitudinal distance between (i) a first point of contact of the clocking nut threads with the clocking shaft threads proximate to the engagement of the slotted sleeve and clocking nut and (ii) a point of contact of the non-circular surface of the slotted sleeve with the abutment of the clocking nut; and
T' is a distance between (i) the first point of contact of the clocking nut threads with the clocking shaft threads proximate to the engagement of the slotted sleeve and the clocking nut and (ii) a last point of contact of the clocking nut threads with the clocking shaft threads farthest from the slotted sleeve and diametrically opposite to the first point of contact.

In accordance with another aspect, there is provided an assembly, comprising a reference component and a removable component. The removable component is removably assembled with the reference component at a target relative position, and is provided with three precision holes therethrough.

The assembly further includes three sets of precision members each associated with a corresponding one of said locking precision holes of the removable component, each set of precision members comprising:
a shaft projecting from the reference component and provided with shaft threads;
a slotted sleeve extending within the corresponding precision hole of the removable component and receiving the shaft therethrough, the sleeve having a non-circular surface within a plane perpendicular to a center axis thereof and defining two opposite contact points; and a nut having nut threads complementary with the shaft threads, the nut being threadably engaged with the shaft and including an abutment engaging the non-circular surface of the slotted sleeve at said two opposite contact points;

wherein a thread angle of the shaft threads and a spatial profile of at least one of the non-circular surface of the slotted sleeve at said opposite contact points and the abutment of the nut provide an automatic alignment of the shaft within the slotted sleeve;

the sets of precision locking members collectively lock all translational and rotational degrees of freedom of the removable component with respect to the reference component, thereby providing a repeatable positioning of the removable component at the target relative position.

In some implementations, the three sets of locking members are respectively oriented so that normals $N_A$, $N_B$ and $N_C$ to planes $P_A$, $P_B$ and $P_C$ containing the center axis and contact points of each set of precision locking members bisect an angle between the sets of precision locking members.

In some implementations, for each set of precision locking members, the spatial profile of the at least one of the non-circular surface of the slotted sleeve at said opposite contact points and the abutment of the nut is a frustro-spherical profile defined by a radius of curvature R', said radius of curvature meeting an auto-alignment condition defined by the equation:

$$R' = \sqrt{\left[\frac{d'_{nut}}{2\tan(\varphi'_{threads}/2)} - h' - T'/2\right]^2 + Y'^2}$$

where:
$d'_{nut}$ is a diameter of the nut along the nut threads;
$\varphi'_{thread}$ is a value of the thread angle of the shaft threads;
Y' is a half-diameter of a contact line between the non-circular surface of the slotted sleeve and the abutment of the nut;
h' is a longitudinal distance between (i) a first point of contact of the nut threads with the shaft threads proximate to the engagement of the slotted sleeve and clocking nut and (ii) a point of contact of the non-circular surface of the slotted sleeve with the abutment of the nut; and
T' is a distance between (i) the first point of contact of the nut threads with the shaft threads proximate to the engagement of the slotted sleeve and the nut and (ii) a last point of contact of the nut threads with the shaft threads farthest from the slotted sleeve and diametrically opposite to the first point of contact.

In some implementations, for each set of precision locking members, the spatial profile of the at least one of the non-circular surface of the slotted sleeve at said opposite contact points and the abutment of the nut is a frustro-conical profile defined by an inclination angle α' with respect to a transversal plane, said inclination angle meeting an auto-alignment condition defined by the equation:

$$\alpha' = \sin^{-1}\left(\frac{Y'}{\sqrt{\left[\frac{d'_{nut}}{2\tan(\varphi'_{threads}/2)} - h' - T'/2\right]^2 + Y'^2}}\right)$$

where:
Y' is a half-diameter of a contact line between the slotted sleeve and the nut;
$d'_{nut}$ is a diameter of the nut along the nut threads;
$\varphi'_{thread}$ is a value of the thread angle of the shaft threads;
h' is a longitudinal distance between (i) a first point of contact of the nut threads with the shaft threads proximate to the engagement of the slotted sleeve and nut and (ii) a point of contact of the non-circular surface of the slotted sleeve with the abutment of the nut; and
T' is a distance between (i) the first point of contact of the nut threads with the shaft threads proximate to the engagement of the slotted sleeve and the nut and (ii) a last point of contact of the nut threads with the shaft threads farthest from the slotted sleeve and diametrically opposite to the first point of contact.

In accordance with another aspect, there is provided a kit for providing the repeatable positioning of a removable component with respect to a reference component, the reference component and removable component each including at least one positioning hole and at least one clocking hole therethrough. The kit comprises:

at least one set of precision positioning members, each comprising:
a positioning shaft provided with positioning shaft threads and configured to be rigidly affixed within one of the at least one positioning hole of the reference component so as to project therefrom;
a positioning sleeve configured to be rigidly affixed within one of the at least one positioning hole of the removable component, the positioning sleeve defining an abutment; and
an alignment nut having alignment nut threads complementary with the positioning shaft threads, the alignment nut being threadedly engageable with the positioning shaft and having an abutment engageable with the abutment of the positioning sleeve;
wherein a spatial profile of at least one of the abutments and a thread angle of the positioning shaft threads are selected to provide an automatic alignment of the positioning shaft within the positioning sleeve; and at least one set of precision clocking members, each comprising:
a clocking shaft provided with clocking shaft threads and configured to be rigidly affixed within one of the at least one clocking hole of the reference component so as to project therefrom; and
a slotted sleeve configured to be rigidly affixed within one of the at least one clocking hole of the removable component, the slotted sleeve having a non-circular surface within a plane perpendicular to a center axis thereof and defining two opposite contact points; and
a clocking nut having clocking nut threads complimentary with the clocking shaft threads, the clocking nut being threadably engageable with the clocking shaft and including an abutment engageable with the non-circular surface of the slotted sleeve at said two opposite contact points;
wherein a thread angle of the clocking shaft threads and a spatial profile of at least one of the non-circular surface of the slotted sleeve at said opposite contact points and the abutment of the clocking nut are selected to provide an automatic alignment of the clocking shaft within the slotted sleeve.

In some implementations, for each of the at least one set of positioning members, the spatial profile of the at least one of the abutments is a frustro-spherical profile defined by a radius of curvature R of the corresponding abutment, said radius of curvature meeting an auto-alignment condition defined by the equation:

$$R = \sqrt{\left[\frac{d_{nut}}{2\tan(\varphi_{threads}/2)} - h - T/2\right]^2 + Y^2}$$

where:
  $d_{nut}$ is a diameter of the alignment nut along the alignment nut threads;
  $\varphi_{thread}$ is a value of the thread angle of the positioning shaft threads;
  Y is a half-diameter of a contact line, in use, between the abutments of the positioning sleeve and the alignment nut;
  h is a longitudinal distance, in use, between (i) a first point of contact of the alignment nut threads with the positioning shaft threads proximate to the abutments of the positioning sleeve and alignment nut and (ii) a point of contact of the abutment of the positioning sleeve with the abutment of the alignment nut; and
  T is a distance, in use, between (i) the first point of contact of the alignment nut threads with the positioning shaft threads proximate to the abutments of the positioning sleeve and the alignment nut and (ii) a last point of contact of the alignment nut threads with the positioning shaft threads farthest from the positioning sleeve and diametrically opposite to the first point of contact.

In some implementations, for each of the at least one set of precision positioning members, the spatial profile of the at least one of the abutments is a frustro-conical profile defined by an inclination angle α of the corresponding abutment with respect to a transversal plane, said inclination angle meeting an auto-alignment condition defined by the equation:

$$\alpha = \sin^{-1}\left(\frac{Y}{\sqrt{\left[\frac{d_{nut}}{2\tan(\varphi_{threads}/2)} - h - T/2\right]^2 + Y^2}}\right)$$

where:
  Y is a half-diameter of a contact line, in use, between the abutments of the positioning sleeve and the alignment nut;
  $d_{nut}$ is a diameter of the alignment nut along the alignment nut threads;
  $\varphi_{thread}$ is a value of the thread angle of the positioning shaft threads;
  h is a longitudinal distance, in use, between (i) a first point of contact of the alignment nut threads with the positioning shaft threads proximate to the abutments of the positioning sleeve and alignment nut and (ii) a point of contact of the abutment of the positioning sleeve with the abutment of the alignment nut; and
  T is a distance, in use, between (i) the first point of contact of the alignment nut threads with the positioning shaft threads proximate to the abutments of the positioning sleeve and the alignment nut and (ii) a last point of contact of the alignment nut threads with the positioning shaft threads farthest from the positioning sleeve and diametrically opposite to the first point of contact.

In some implementations, for each of the at least one set of precision positioning members, the abutment of the positioning sleeve has said spatial profile providing an automatic alignment of the positioning shaft within the positioning sleeve.

In some implementations, for each of the at least one set of precision positioning members, the abutment of the alignment nut has said spatial profile providing an automatic alignment of the positioning shaft within the positioning sleeve.

In some implementations, for each set of the at least one set of precision clocking members, the spatial profile of the at least one of the non-circular surface of the slotted sleeve at said opposite contact points and the abutment of the clocking nut is a frustro-spherical profile defined by a radius of curvature R', said radius of curvature meeting an auto-alignment condition defined by the equation:

$$R' = \sqrt{\left[\frac{d'_{nut}}{2\tan(\varphi'_{threads}/2)} - h' - T'/2\right]^2 + Y'^2}$$

where:
  $d'_{nut}$ is a diameter of the clocking nut along the clocking nut threads;
  $\varphi'_{thread}$ is a value of the thread angle of the clocking shaft threads;
  Y' is a half-diameter of a contact line, in use, between the non-circular surface of the slotted sleeve and the abutment of the clocking nut;
  h' is a longitudinal distance, in use, between (i) a first point of contact of the clocking nut threads with the clocking shaft threads proximate to the engagement of the slotted sleeve and clocking nut and (ii) a point of contact of the non-circular surface of the slotted sleeve with the abutment of the clocking nut; and
  T' is a distance, in use, between (i) the first point of contact of the clocking nut threads with the clocking shaft threads proximate to the engagement of the slotted sleeve and the clocking nut and (ii) a last point of contact of the clocking nut threads with the clocking shaft threads farthest from the slotted sleeve and diametrically opposite to the first point of contact.

In some implementations, for each of the at least one set of precision clocking members, the spatial profile of the at least one of the non-circular surface of the slotted sleeve at said opposite contact points and the abutment of the clocking nut is a frustro-conical profile defined by an inclination angle α' with respect to a transversal plane, said inclination angle meeting an auto-alignment condition defined by the equation:

$$\alpha' = \sin^{-1}\left(\frac{Y'}{\sqrt{\left[\frac{d'_{nut}}{2\tan(\varphi'_{threads}/2)} - h' - T'/2\right]^2 + Y'^2}}\right)$$

where:
  Y' is a half-diameter of a contact line, in use, between the slotted sleeve and the clocking nut;
  $d'_{nut}$ is a diameter of the clocking nut along the clocking nut threads;
  $\varphi'_{thread}$ is a value of the thread angle of the clocking shaft threads;
  h' is a longitudinal distance, in use, between (i) a first point of contact of the clocking nut threads with the clocking shaft threads proximate to the engagement of the slotted sleeve and clocking nut and (ii) a point of contact of the non-circular surface of the slotted sleeve with the abutment of the clocking nut; and T' is a distance, in use, between (i) the first point of contact of the clocking nut threads with the clocking shaft threads proximate to the engagement of the slotted sleeve and the clocking nut and (ii) a last point of contact of the clocking nut threads with the clocking shaft threads farthest from the slotted sleeve and diametrically opposite to the first point of contact.

In some implementations, each set of precision positioning members comprises a positioning stud including a cylindrical base configured to be rigidly affixed within one of the at least one positioning hole of the reference component, the positioning stud further comprising the positioning shaft projecting concentrically from the cylindrical base.

In some implementations, each set of precision clocking members comprises a clocking stud including a cylindrical base configured to be rigidly affixed within one of the at least one clocking hole of the reference component, the clocking stud further comprising the clocking shaft projecting concentrically from the cylindrical base.

Other features and advantages of the invention will be better understood upon reading of embodiments thereof with reference to the appended drawing.

BRIEF DESCRIPTION OF THE DRAWINGS

FIGS. 1 and 2 (PRIOR ART) illustrate configurations for the precise alignment of mechanical and opto-mechanical assemblies according to prior art.

FIGS. 5A to 5D illustrate various thread profiles.

FIG. 6 is a cross-section side view of the positioning members within an assembly according to one embodiment, defining the parameters involved in an auto-alignment condition.

FIG. 7 to 13 are cross-section partial side views of the positioning members within assemblies according to various embodiments.

FIGS. 14A, 14B and 14C illustrate clocking members according to one embodiment.

DETAILED DESCRIPTION

The present description generally relates to assemblies providing the repeatable positioning of a removable component with respect to a reference component. The reference and removable components may be embodied by any pair of mechanical parts, opto-mechanical parts or the like which are to be positioned with respect to each other with both precision and repeatability. In one implementation, the reference component is an optical bench, an optical table, a breadboard or a mechanical structure, and the removable component is an optical mount, an optical source or a detector. In one example, a mirror mount and a lens tube assembly may need to be removed from an optical bench for recoating of the optical elements after a certain amount of time. The use of the assembly described herein can provide the mounting of the optical elements back to their original position on the optical bench with a high level of repeatable accuracy. In another example, an assembly such as described herein may be used to provide a repeatable interface for fabrication processes such as machining. Another implementation could be to connect two shafts together by using this attachment and a locking element such as pin or spline shape for clocking control.

In accordance with one aspect and as will be understood from the descriptions of examples provided below, the assembly includes precision positioning members designed such that their assemblage provides an "automatic" positioning of the removable and reference component with respect to each other, at a same precise relative position, in a repeatable manner. In some implementations, clocking members enabling the locking of the relative orientation of the reference component and removable component may also be provided, as explained further below.

Figure 3:
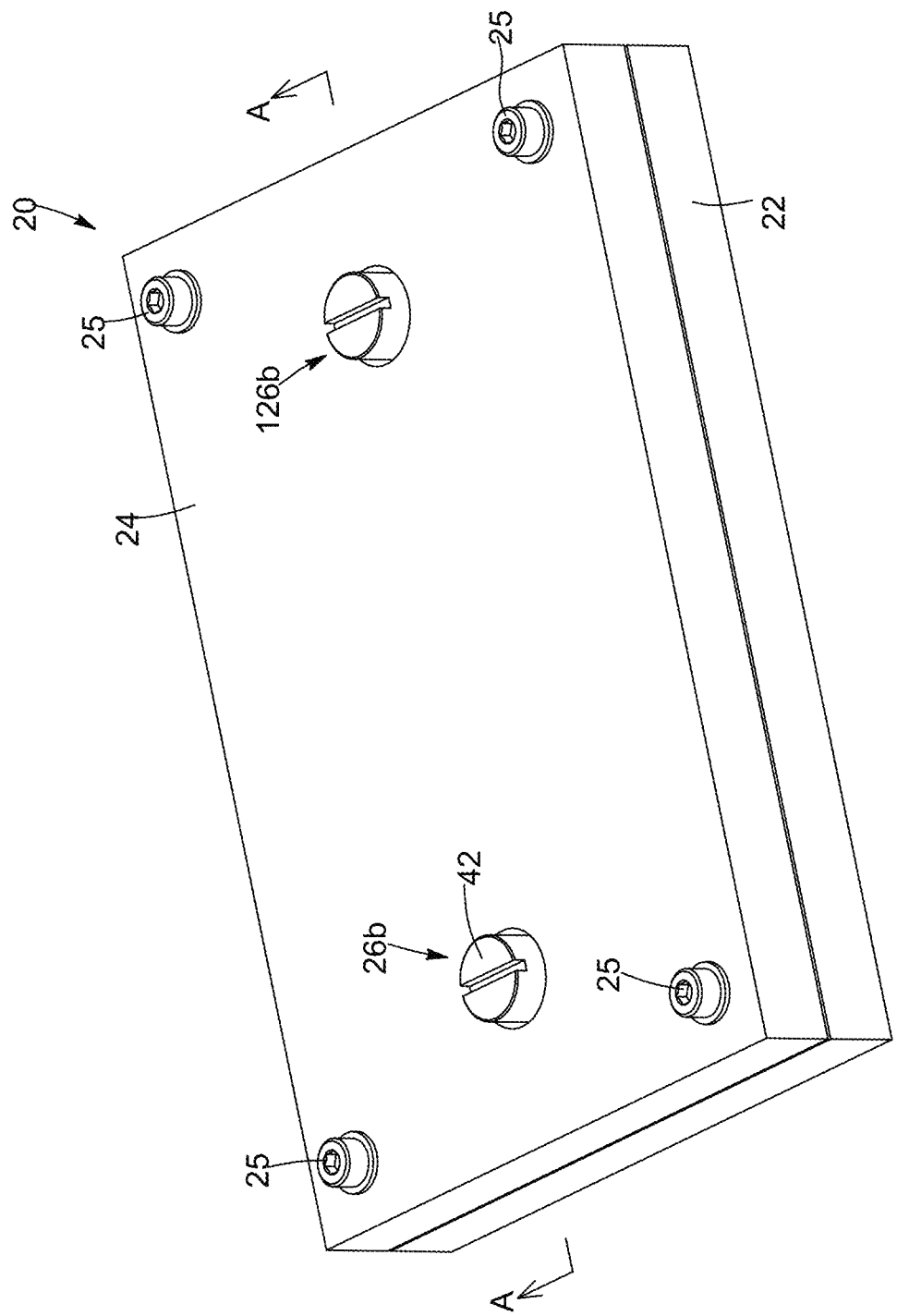
FIG. 3 is a perspective view of an assembly according to one embodiment.
Figure 3A:
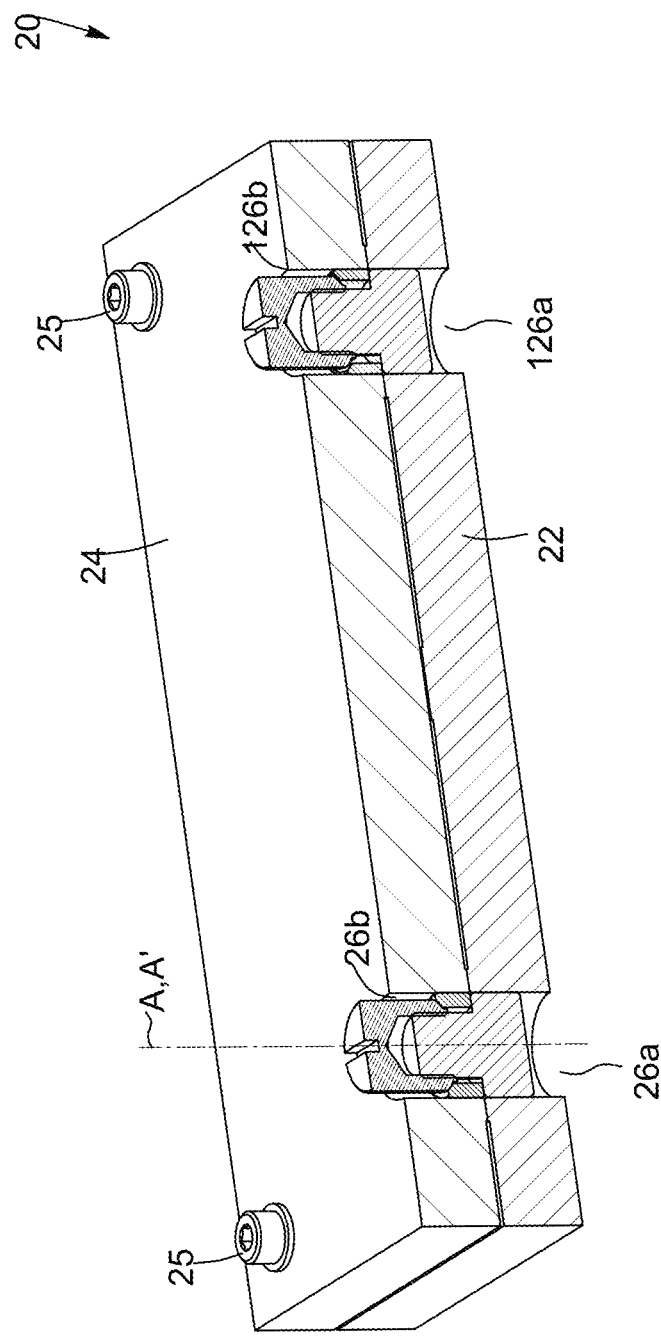
FIG. 3A is a cross-section view along lines A-A of FIG. 3.

Referring to FIGS. 3 and 3A, there is shown an example of an assembly 20 according to one implementation. As mentioned above, the assembly 20 includes a reference component 22 and a removable component 24. In the illustrated embodiment the reference component 22 includes a positioning hole 26a extending therein or therethrough, and the removable component 24 also includes a positioning hole 26b therethrough. In the illustrated variants the respective positioning holes 26a, 26b of the reference component 22 and removable component 24 have the same or similar diameters, although it will be understood that in other variants they may having different dimensions. Both positioning holes 26a, 26b are located on the respective component 22, 24 such that they are in alignment with each other when the reference and removable components 22, 24 are in the desired positions relative to each other. The positioning holes 26a and 26b preferably define cylindrical cavities and are considered in alignment when their respective longitudinal axes A, A' coincide. Similarly, the assembly 20 preferably further includes clocking holes 126a and 126b respectively extending in or through the reference component 22 and removable component 24 and aligned with each other when the two components are in the desired position and orientation with respect to each other.

In some implementations, each positioning hole 26a, 26b and clocking hole 126a, 126b is machined in the respective component 22, 24 on a CNC milling using best practice to minimize the position error and using precision tools such as a reamer.

Precision Positioning Members

In some implementations, the assembly includes a set of precision positioning members providing a repeatable positioning of the removable component at the target relative position. Precision positioning members are provided within the cavities defined by the positioning holes to enable the repeatable relative positioning of the reference component and removable component.

Figure 4:
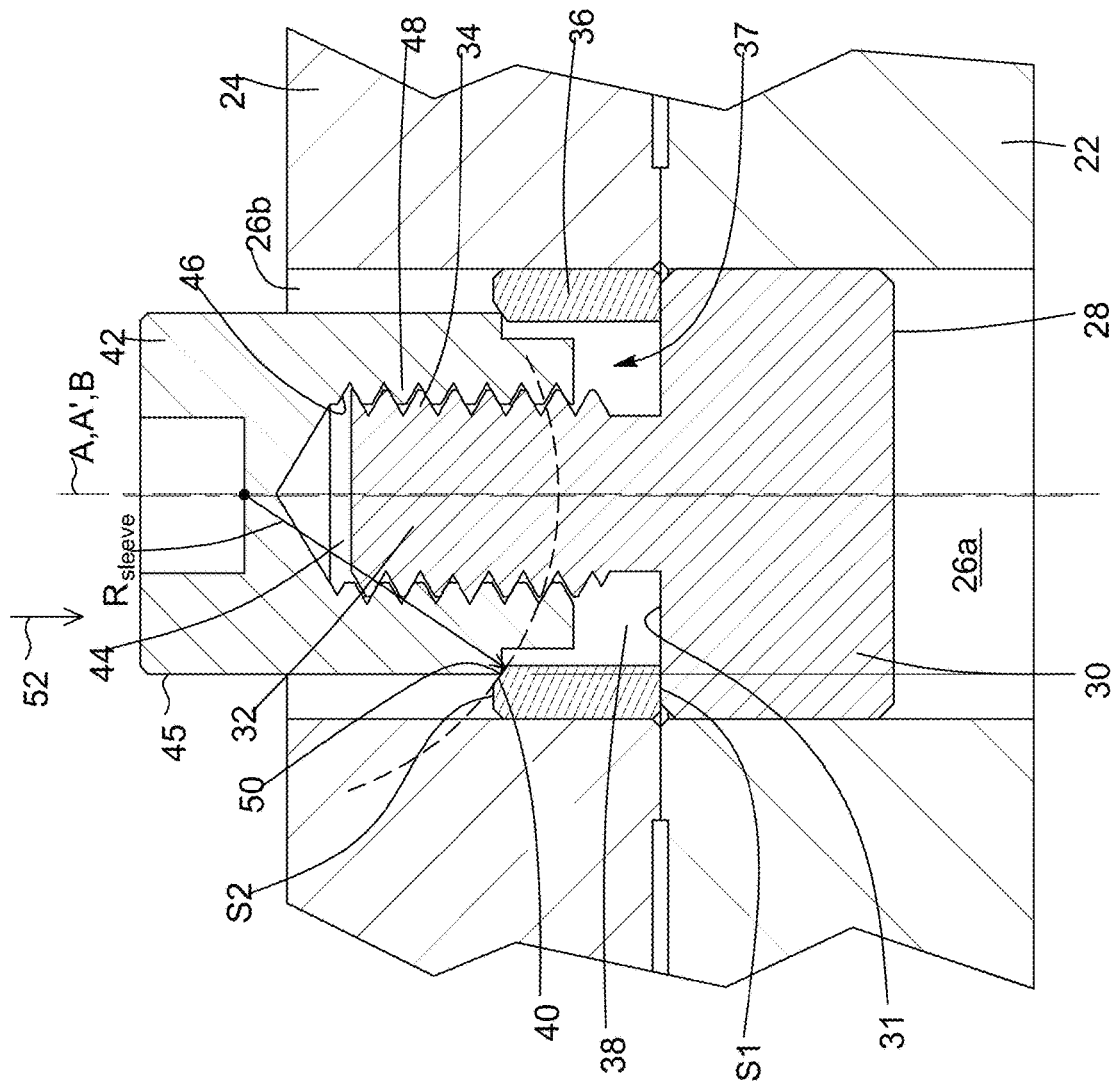
FIG. 4 is a cross-section side view of the positioning members within an assembly according to one embodiment.

Still referring to FIGS. 3 and 3A and with additional reference to FIG. 4, in one implementation the precision positioning members include a positioning stud 28 mounted in the positioning hole 26a of the reference component 22. In some embodiments, the positioning stud 28 includes a cylindrical base 30 and a positioning shaft 32 projecting concentrically from said base 30. The positioning shaft 32 has a longitudinal center axis B. The positioning shaft 32 is provided with positioning shaft threads 34 extending along its perimeter, as explained further below. The positioning stud 28 may be securely mounted into the positioning hole 26a of the reference component 22 by press fitting the cylindrical base 30 in the cylindrical cavity defined by the positioning hole 26a.

When the positioning stud 28 is mounted in the positioning hole 26a of the reference component 22, the positioning shaft 32 preferably projects outwardly of the positioning hole 26a and extends inside the positioning hole 26b of the removable component 24. The positioning stud 28 is mounted within the positioning hole 26a of the reference component 22 such that the longitudinal center axis B of the positioning shaft 32 coincides with the longitudinal axis A of the positioning hole 26a. As will be readily understood by one skilled in the art, within manufacturing tolerances the center axis B defines a reference axis perpendicular to the reference component 22.

With particular reference to FIG. 4, the precision positioning members further include a positioning sleeve 36 extending within the positioning hole 26b of the removable component 24. In some embodiments, the positioning sleeve 36 is generally ring-shaped and has an outer diameter matching the inner diameter of the cylindrical cavity defined by the positioning hole 26b of the removable component 24, and is securely mounted therein by press fitting or the like. The positioning sleeve 36 has a sleeve cavity 37 therethrough having an inner diameter which is greater than the outer diameter of the positioning shaft 32, leaving a radial gap 38 therebetween when the reference and removable components 22 and 24 are in their desired relative position. The positioning sleeve 36 may have opposite first and second annular surfaces S1 and S2. The first annular surface S1 may be planar and is preferably in contact with the planar top surface 31 of the base 30 of the positioning stud 28.

The precision positioning members further include an alignment nut 42. The alignment nut 42 includes a nut cavity 44 extending longitudinally therethrough and an outer wall 45, and may have a generally tubular shape or include a portion of generally tubular shape. The alignment nut 42 or a portion thereof is insertable into the positioning hole 26b of the removable component 24 and over the positioning shaft 32. The nut cavity 44 has an inner wall 46 provided with a set of alignment nut threads 48. The alignment nut threads 48 are complementary to the positioning shaft threads 34 of the positioning shaft 32 of the positioning stud 28, such that the alignment nut 42 can be threadedly engaged with or screwed onto the positioning shaft 32.

The expression "threads" is meant to refer to engageable helicoidal projections on two components allowing one component to be screwed on or within the other. By convention, a single thread is generally considered to be the portion of a helicoidal projection corresponding to one screw turn, whereas the length of the projection defining the entire screw path is referred to as threading or a set of threads. In the illustrated embodiment of FIG. 4, the alignment nut threads 48 are disposed along the inner wall 46 of the alignment nut 42, whereas the positioning shaft threads are disposed along the outer perimeter of the positioning shaft 32, such that the alignment nut 42 can be screwed onto the positioning shaft 32. With additional reference to FIG. 4A, the engagement between the positioning shaft threads 34 and the alignment nut threads 48 can be seen to preferably take place between forward thread faces 35 of the positioning shaft threads 34, facing towards the base 30 of the positioning stud 28, and rearward thread faces 49 of the alignment nut threads 48, facing away from the base 30 of the positioning stud 28. It will be readily understood that either set of threads 34, 48 need not be continuous along the entire screw path, but may include missing segments or other discontinuities as long as sufficient contact points are provided to allow engagement of the complementary threads.

Figure 5A:
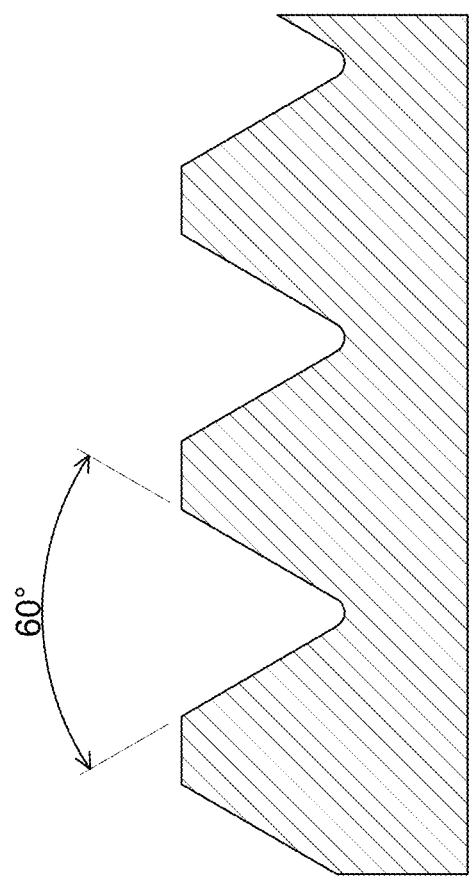
Figure 5B:
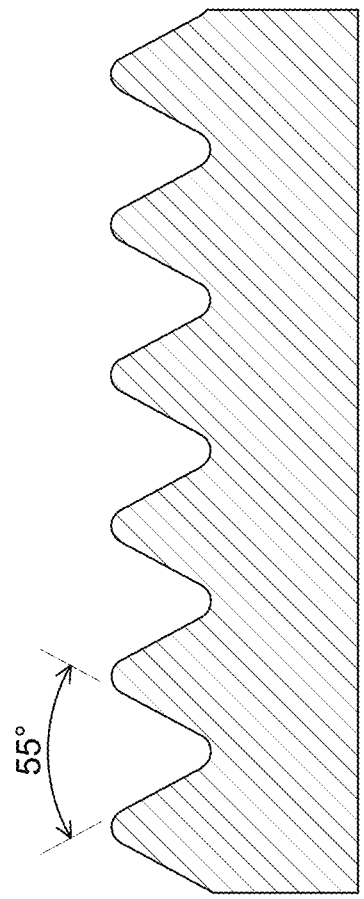

In some implementations, the nut and positioning shaft threads 48, 34 have same cross-sectional thread shape, thread angle and pitch. By definition, the thread angle is the angle formed by the opposite walls of a thread when viewed in cross-section, while the pitch of a thread set is the spacing between two consecutive crests in a set of threads. By «complementary», it is understood that the profiles of the positioning shaft threads 34 and alignment nut threads 48 are such that they can be screwed together, which usually involves a same pitch (within mechanical tolerances allowing their proper engagement and relative rotation). Although the positioning shaft threads 34 and alignment nut threads 48 may have a same overall shape in some embodiments, in other variants they may have different shapes as long as the complementary condition as explained above is met. Referring to FIGS. 5A to 5D, various cross-sectional thread shapes are illustrated, by way of example. FIG. 5A shows a truncated triangular thread shape with a thread angle of 60°, which is representative of a common thread standard. The crest of each thread is shown as truncated, although in different embodiments the thread shape may define a regular triangle. In the example of FIG. 5B, the crests and grooves of the threads are shown as having a rounded shape, and the thread angle is shown as 55°. The thread shapes shown in FIGS. 5A and 5B are commonly used for mounting optical components. However, other thread shapes are also known in the art, such as a trapezoidal shape (FIG. 5C), or a regular triangular shape (FIG. 5D). In other variants, the thread shape may be non-symmetrical, that is, the opposite walls of a thread may be oriented at different angles with respect to a plane perpendicular to the center axis of the cavity. Of course, the shapes and thread angles shown herein are given by way of example only and should not be construed as exhaustive representations of possible thread profiles.

Referring back to FIGS. 4 and 4A, in the process of screwing the alignment nut 42 in place on the positioning stud 28, the alignment nut 42 follows a generally longitudinal course 52 within the cavity 37 of the positioning sleeve 36, toward the reference component 22. This longitudinal course 52 is eventually blocked when the alignment nut 42 contacts the second surface S2 of the positioning sleeve 36. This contact takes place between respective abutments 40, 50 on the positioning sleeve 36 and on the alignment nut 42. Both abutments 40, 50 define a surface or a line extending around the periphery of the alignment nut 42, and contact each other along a peripheral engagement 54. In some embodiments, the peripheral engagement 54 may be one-dimensional if one of the abutments is an edge, and therefore defines an annular contact line. In other variants, the peripheral engagement 54 may be two-dimensional and define an annular contact area if the contact between the abutments 40, 50 is surface-to-surface.

The abutments 40 and 50 of the positioning sleeve 36 and alignment nut 42 may be embodied by any regions of the positioning sleeve 36 and of the alignment nut 42 located to engage each other upon the screwing of the alignment nut 42 over the positioning shaft 32. The abutment 40 of the positioning sleeve 36 may be defined by a boundary of the second surface S2 of the positioning sleeve 36. In the illustrated example of FIGS. 4 and 4A, the abutment 50 of the alignment nut 42 is defined by a shoulder where the shape of the alignment nut 42 transitions between two cylinders of different diameters. In other configurations, the abutment 50 of the alignment nut 42 may be defined by an edge of the alignment nut 42 at a reference component-side boundary thereof.

In accordance with one aspect, the profile of one or both abutments 40, 50 is selected to ensure an automatic alignment of the positioning shaft 32 within the positioning sleeve 36. In some embodiments, this may be achieved by jointly selecting the thread angle of the positioning shaft and alignment nut threads 34, 48 and the spatial profile of one or both abutments 40, 50 so that an auto-alignment condition is met.

As known in the art, engageable sets of threads have a certain degree of play between them, to enable their relative movement. In the present context, this play leads to a potential decentering of the alignment nut 42 with respect to the center axis B, accompanied by a tilt of the alignment nut 42. Referring again to FIG. 4A, it can be demonstrated that the lateral motion of the alignment nut 42 as it is screwed over the positioning stud 28 is constrained along the surface of imaginary spheres $S_{threads1}$, $S_{threads2}$, . . . having their center approximately positioned at a common point lying on the center axis B. These spherical surfaces $S_{threads}$ describe the trajectory of the line of contact between the forward faces 35 of the positioning shaft threads 34, with the rearward faces 49 of the nut thread 48. The expression "lateral motion" used herein refers to a motion along a direction lying in a plane perpendicular to the center axis B.

In some implementations, one or both abutments 40, 50 has a frustro-spherical profile, that is, the profile defines a circular arc segment having a symmetry of revolution about the center axis of the positioning sleeve 36 or of the alignment nut 42. The radius of curvature of the frustro-spherical profile is selected in view of the thread angle to maintain a centering of the positioning shaft 32 and the positioning sleeve 36 with respect to each other, even if the alignment nut 42 is itself decentered, as explained further below.

Figure 4A:
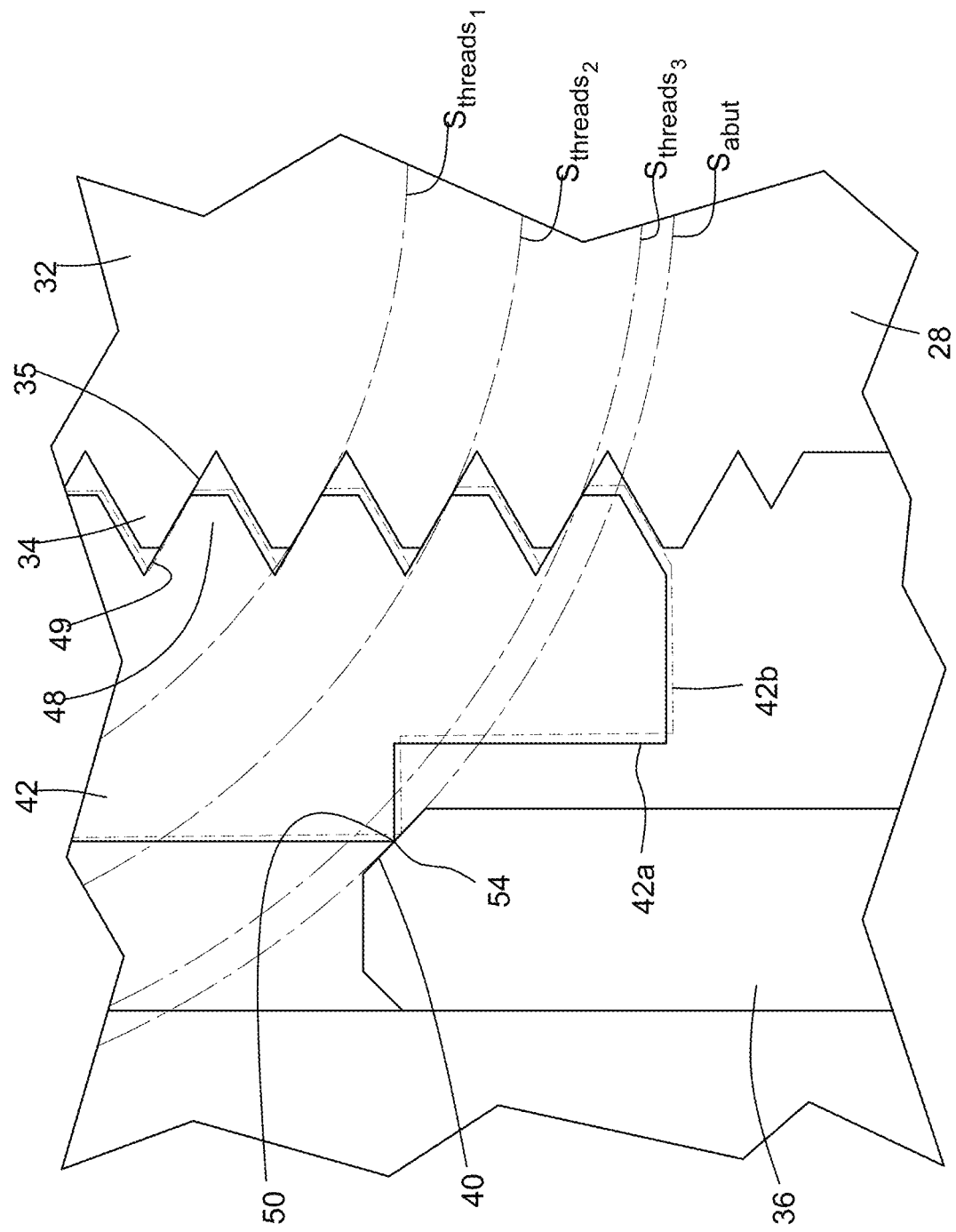
FIG. 4A is an enlarged view of the peripheral engagement of the positioning sleeve and alignment nut of the assembly of FIG. 4.

In the illustrated example of FIGS. 4 and 4A, the abutment 40 of the positioning sleeve 36 has the frustro-spherical profile mentioned above, and the abutment 50 of the alignment nut 42 is shaped as a corner or an edge, which may or may not be rounded. In this case, the peripheral engagement 54 is a circular contact line extending all around the alignment nut 42. By providing the abutment 40 of the positioning sleeve 36 with a frustro-spherical profile having a radius of curvature $R_{sleeve}$ defining a sphere $S_{abut}$ concentric with the spheres $S_{threads}$ describing the movement of the alignment nut 42 over the threads of the positioning stud 28, the relative alignment of the positioning sleeve 36 and the positioning shaft 32 remains the same regardless of the decentering of the alignment nut 42. This is for example illustrated in FIG. 4A by showing two different positions 42a and 42b of the alignment nut 42 along the imaginary spheres $S_{threads}$. It can be seen that the movement of the peripheral engagement on the frustro-spherically-shaped abutment 40 of the positioning sleeve 36 follows the same trajectory as the movement of the alignment nut threads 48 on the positioning shaft threads 34, such that the positioning shaft 34 is maintained centered with respect to the positioning sleeve 36 no matter the decentering and the resulting tilt of the alignment nut 42.

It can be demonstrated that the above auto-alignment condition may be met if the radius of curvature $R_{sleeve}$ of the abutment 40 of the positioning sleeve 36 is given by the following equation:

$$R_{sleeve} = \sqrt{\left[\frac{d_{nut}}{2\tan(\varphi_{threads}/2)} - h - T/2\right]^2 + Y^2} \quad (1)$$

where, using the parameters illustrated on FIG. 6:
  $R_{sleeve}$ is the radius of curvature of the abutment 40 of the positioning sleeve;
  $d_{nut}$ is the diameter of the alignment nut along the alignment nut threads;
  $\varphi_{thread}$ is the value of the thread angle of the positioning shaft threads;
  Y is the half-diameter of the contact line between the positioning sleeve and the alignment nut;
  h is the distance along the longitudinal direction of the cavity between (i) a first point of contact of the alignment nut threads with the positioning shaft threads proximate to the abutments 40, 50 and (ii) a point of contact of the abutment 40 of the positioning sleeve with the alignment nut abutment 50; and
  T is the distance between (i) a first point of contact of the alignment nut threads with the positioning shaft threads proximate to the abutments 40, 50 and (ii) a last point of contact of the alignment nut threads with the positioning shaft threads farthest from the positioning sleeve and diametrically opposite to the first point of contact.

It will be noted that using the reference points shown in FIG. 6, by convention the sign of the parameter T is negative and the sign of the parameter h is positive.

In some variants, the value of the diameter of the alignment nut $d_{nut}$ may be selected as the mid-diameter corresponding to the distance between a contact point at the crest of the positioning shaft thread with the alignment nut thread flank on one side, and to a contact point at the crest of the alignment nut thread with the positioning shaft thread flank on the opposite side. Thus, this diameter is the sum of half the major diameter of the positioning shaft thread added to half the minor diameter of the alignment nut thread.

It will be readily understood by one versed in the art, from a reading of the present specification as a whole, that the assembly should allow for some movement between the removable component 24 and the reference component 22 so that their relative alignment can be affected by the axial force imposed by the alignment nut. In some embodiments, this implies that the alignment nut meets the so-called "self-centering" criterion known in the opto-mechanical art. As one skilled in the art will readily understand, this condition is met when the contact angle between the abutments 40, 50 of the positioning sleeve and the alignment nut is large enough to overcome the friction between the two components.

In some implementations, the alignment nut 42 may remain in the assembly after the removable and reference components have been properly positioned or repositioned. Preferably, once this positioning has been achieved it may be blocked by providing additional fasteners such as mounting screws 25 (see FIG. 3). In such a variant, the alignment nut may then be removed from the assembly and kept for later use when the removable component 24 needs to be temporarily removed from the assembly.

While the auto-alignment in the assembly described above is provided by the frustro-spherical profile of the abutment 40 of the positioning sleeve 36, it will be readily understood that other configurations may provide the same result. Examples of these other configurations are described below.

Referring to FIG. 7, in some implementations, the play between the positioning shaft threads 34 and the alignment nut threads 48 may be small enough that the alignment of the positioning shaft 32 within the cavity 37 of the positioning sleeve 36 can be substantially obtained by approximating the frustro-spherical profile described above to a frustro-conical profile. Such a profile defines an inclined linear segment having a symmetry of revolution about the center axis of positioning sleeve 36 or alignment nut 42. The inclination angle α of the abutment 40 with respect to a transversal plane of the cavity 37 of the positioning sleeve 36 or alignment nut 42 (a plane perpendicular to the center axis) is selected in view of the thread angle to maintain the alignment of the positioning stud 28 within the cavity 37 even if the alignment nut 42 is decentered and tilted. It can be demonstrated that this condition is met if:

$$\alpha = \sin^{-1}\left(\frac{Y}{R_{Sleeve}}\right) \quad (2)$$

where:
α is the inclination angle of the abutment with respect to a transversal plane;
Y is the half-diameter of the contact line between the positioning sleeve and the alignment nut; and
$R_{sleeve}$ is the radius of curvature of the equivalent frustro-spherical profile of the positioning sleeve which defines a sphere $S_{abut}$ concentric with the imaginary spheres $S_{threads}$ describing the movement of the alignment nut as explained above. $R_{sleeve}$ is therefore given by equation (1) above and depends on the diameter of the alignment nut along the alignment nut threads $d_{nut}$, the value of the thread angle $\varphi_{thread}$, the half-diameter Y of the contact line between the positioning sleeve and the alignment nut, and the distances h and T.

Combining equations (1) and (2), the inclination angle may be expressed as:

$$\alpha = \sin^{-1}\left(\frac{Y}{\sqrt{\left[\frac{d_{nut}}{2\tan(\varphi_{threads}/2)} - h - T/2\right]^2 + Y^2}}\right) \quad (3)$$

where:
Y is a half-diameter of a contact line between the abutments of the positioning sleeve and the alignment nut;
$d_{nut}$ is a diameter of the alignment nut along the alignment nut threads;
$\varphi_{thread}$ is a value of the thread angle of the positioning shaft threads;
h is a longitudinal distance between (i) a first point of contact of the alignment nut threads with the positioning shaft threads proximate to the abutments of the positioning sleeve and alignment nut and (ii) a point of contact of the abutment of the positioning sleeve with the abutment of the alignment nut; and
T is a distance between (i) the first point of contact of the alignment nut threads with the positioning shaft threads proximate to the abutments of the positioning sleeve and the alignment nut and (ii) a last point of contact of the alignment nut threads with the positioning shaft threads farthest from the positioning sleeve and diametrically opposite to the first point of contact.

Figure 8A:
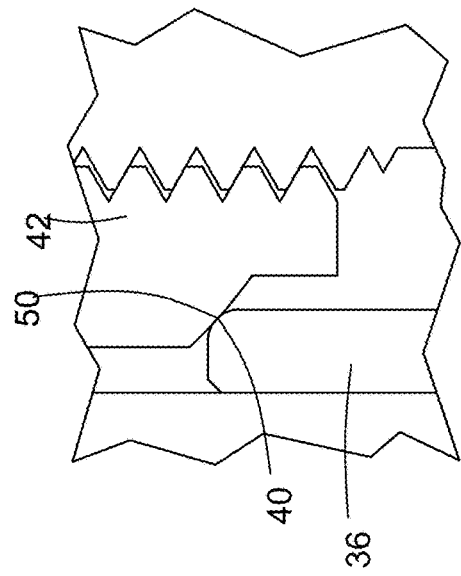
Figure 8B:
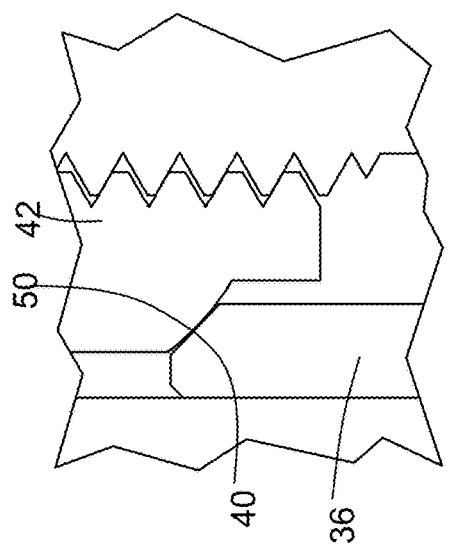
Figure 8C:
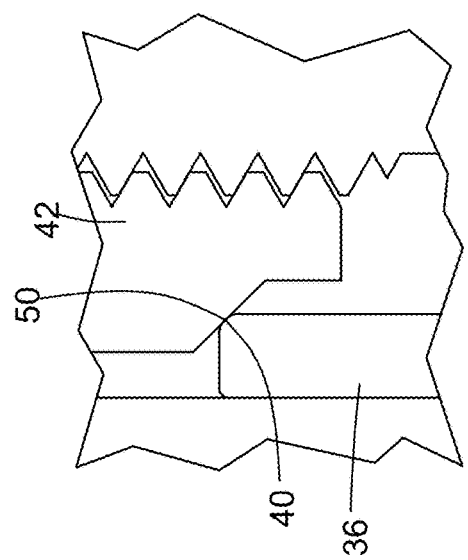

In the illustrated example of FIGS. 4A and 7, the frustro-spherical or frustro-conical profile meeting the auto-alignment condition is provided on the abutment 40 of the positioning sleeve 36. Referring to FIGS. 8A to 8C, in other variants, the frustro-spherical or frustro-conical profile may be provided on the abutment 50 of the alignment nut 42. FIG. 8A shows a variant where the abutment 50 of the alignment nut 42 has a frustro-spherical profile and can "roll" on a chamfer embodying the abutment 40 of the positioning sleeve 36. FIG. 8B shows a variant where the abutment 40 of the positioning sleeve 36 defines a rounded corner on which the frustro-spherical abutment 50 of the alignment nut 42 can roll as well. In both cases, the frustro-spherical profile of the abutment 50 of the alignment nut has a radius of curvature $R_{nut}$ which meets the auto-alignment condition:

$$R_{nut} = \sqrt{\left[\frac{d_{nut}}{2\tan(\varphi_{threads}/2)} - h - T/2\right]^2 + Y^2} \quad (4)$$

Referring to FIG. 8C, in another variant the abutment 50 of the alignment nut 42 has a frustro-conical profile defined by an inclination angle α as explained above, and preferably meeting the condition:

$$\alpha = \sin^{-1}\left(\frac{Y}{R_{Nut}}\right) \quad (5)$$

Figure 9:
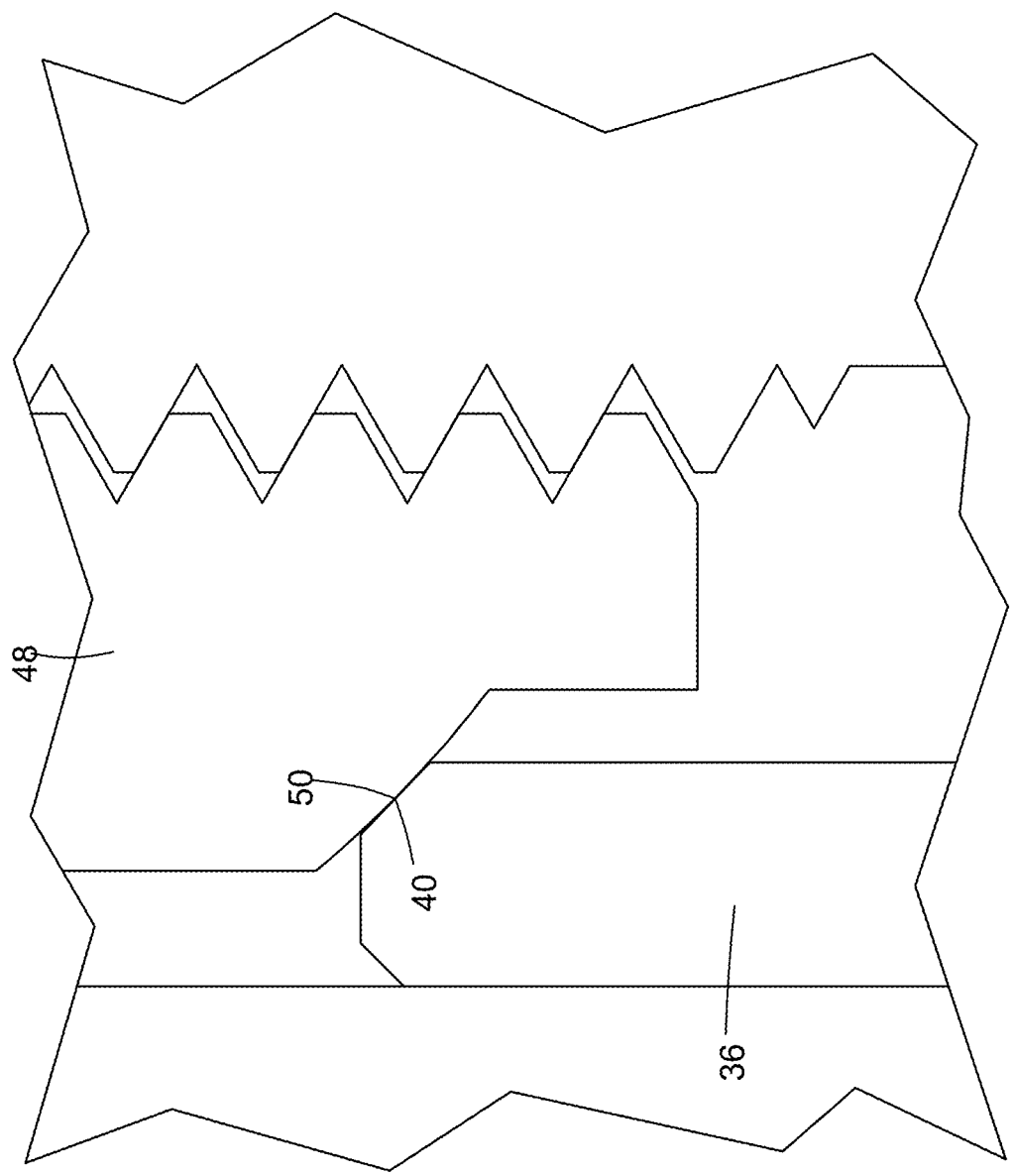

Referring to FIG. 9, in another implementation, both the abutments 40 and 50 of the positioning sleeve 36 and alignment nut 42 may have matching concave and convex frustro-spherical profiles rolling one against the other and meeting the auto-alignment condition explained above.

Figure 10:
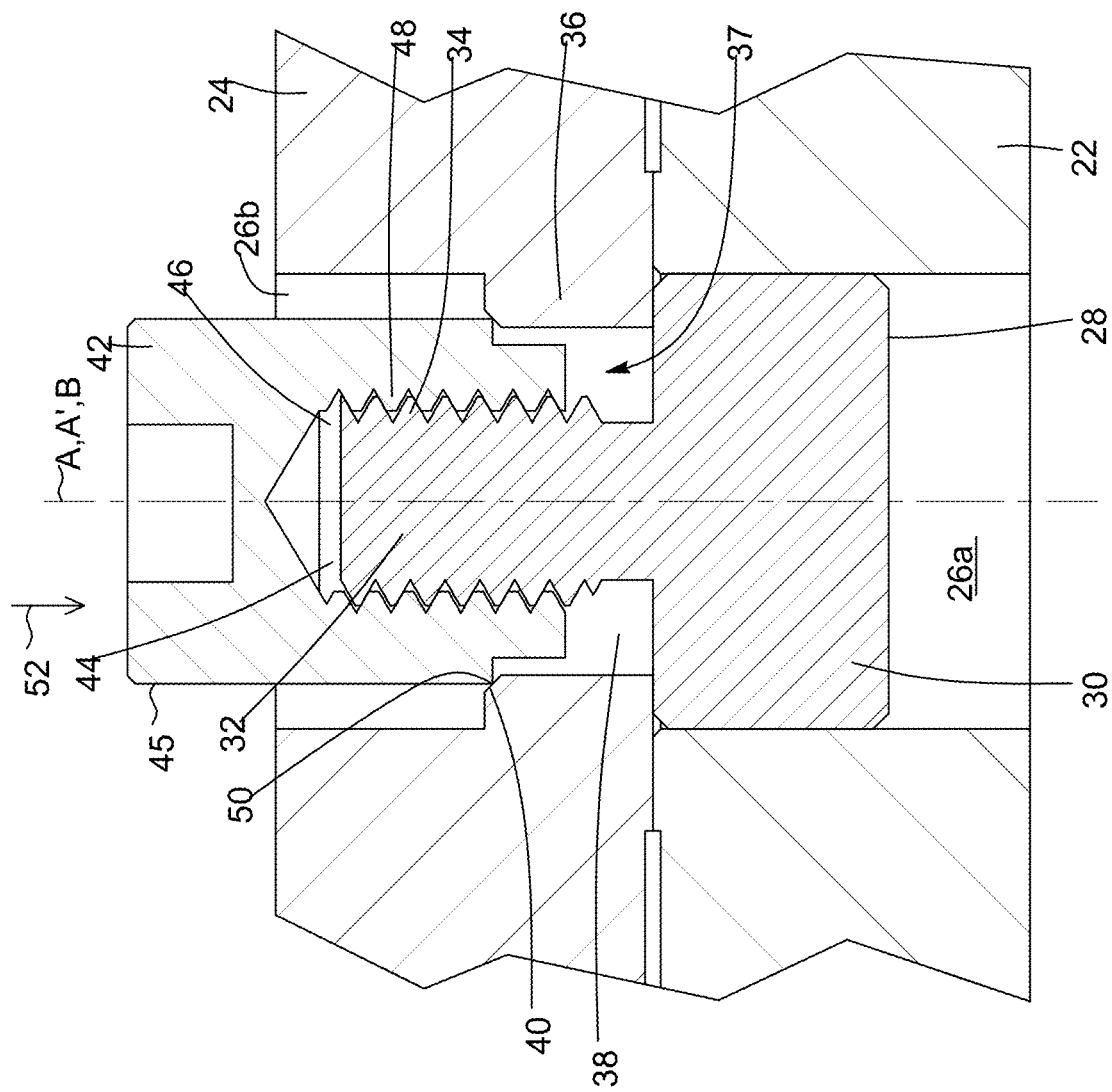
Figure 11:
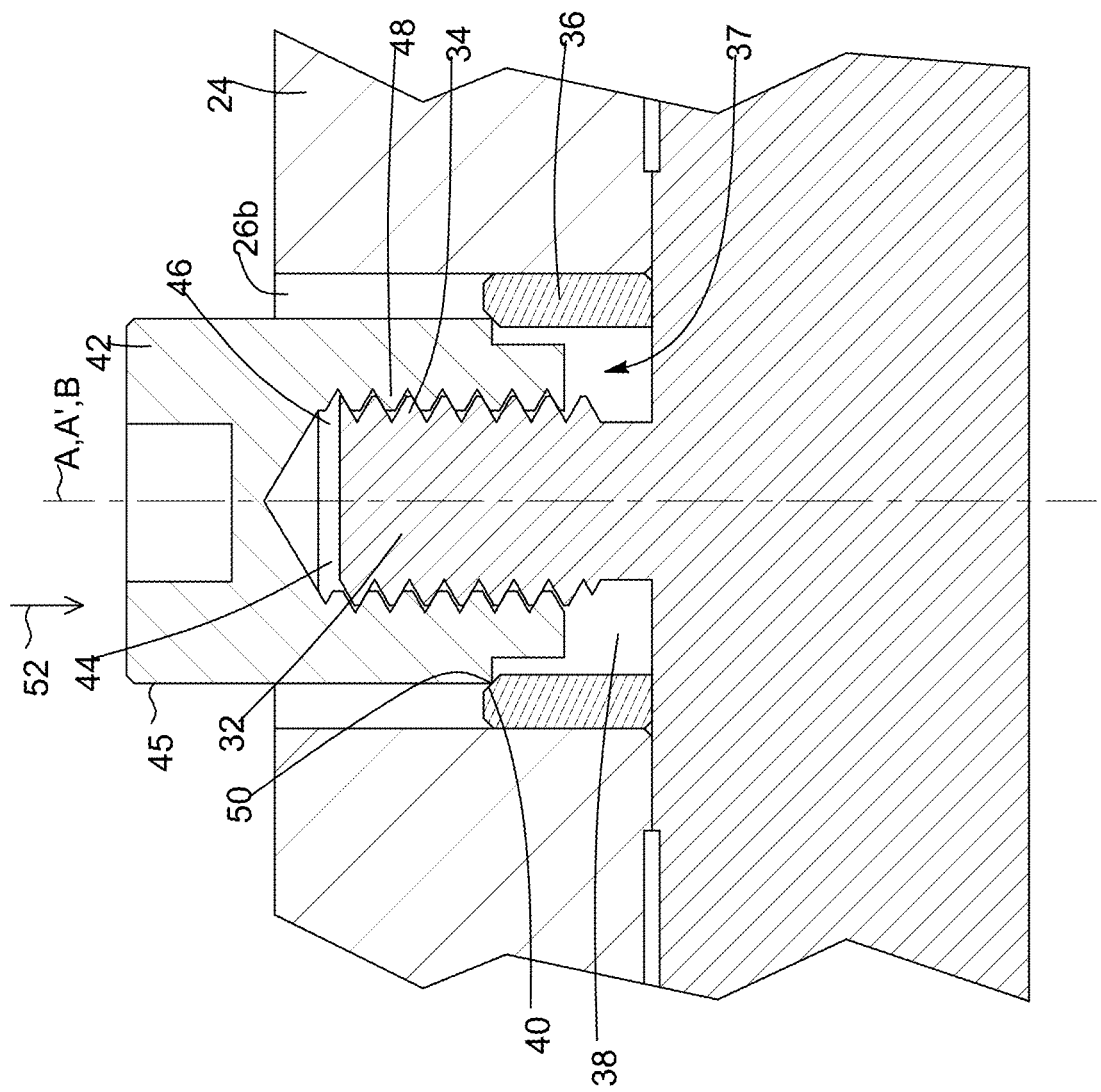
Figure 12:
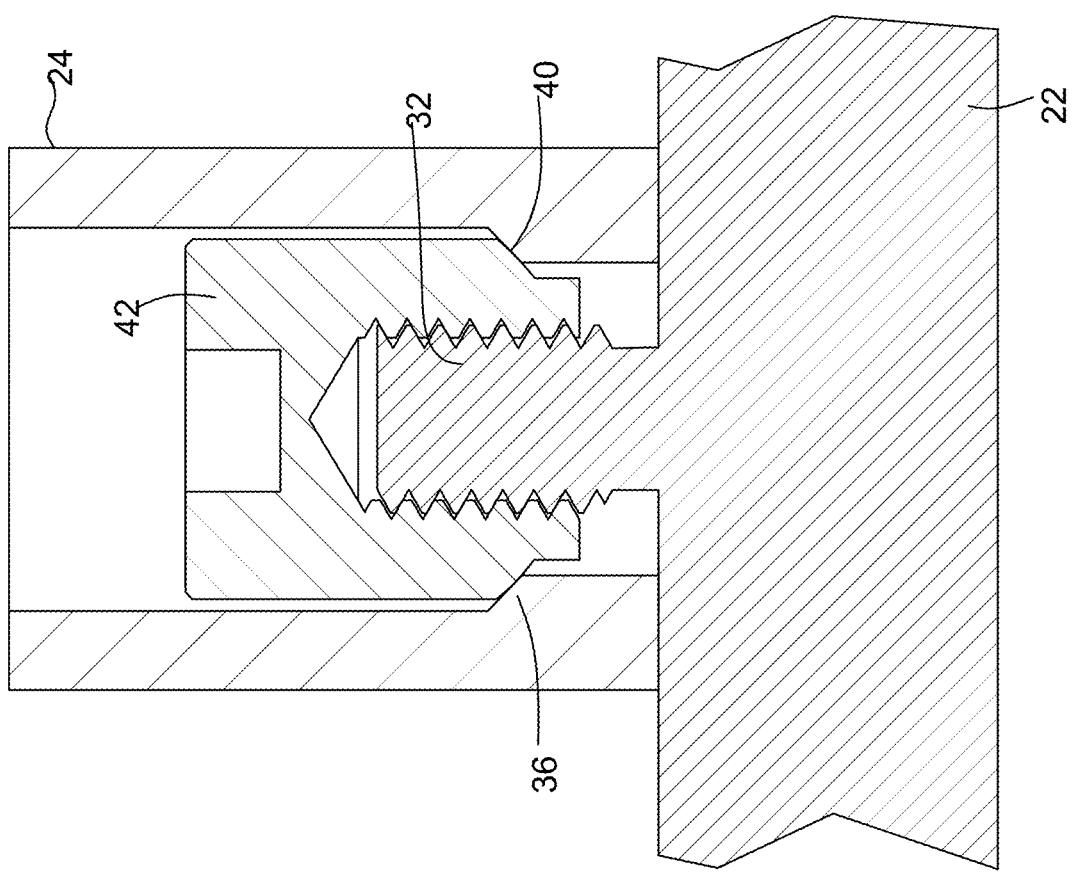
Figure 13:
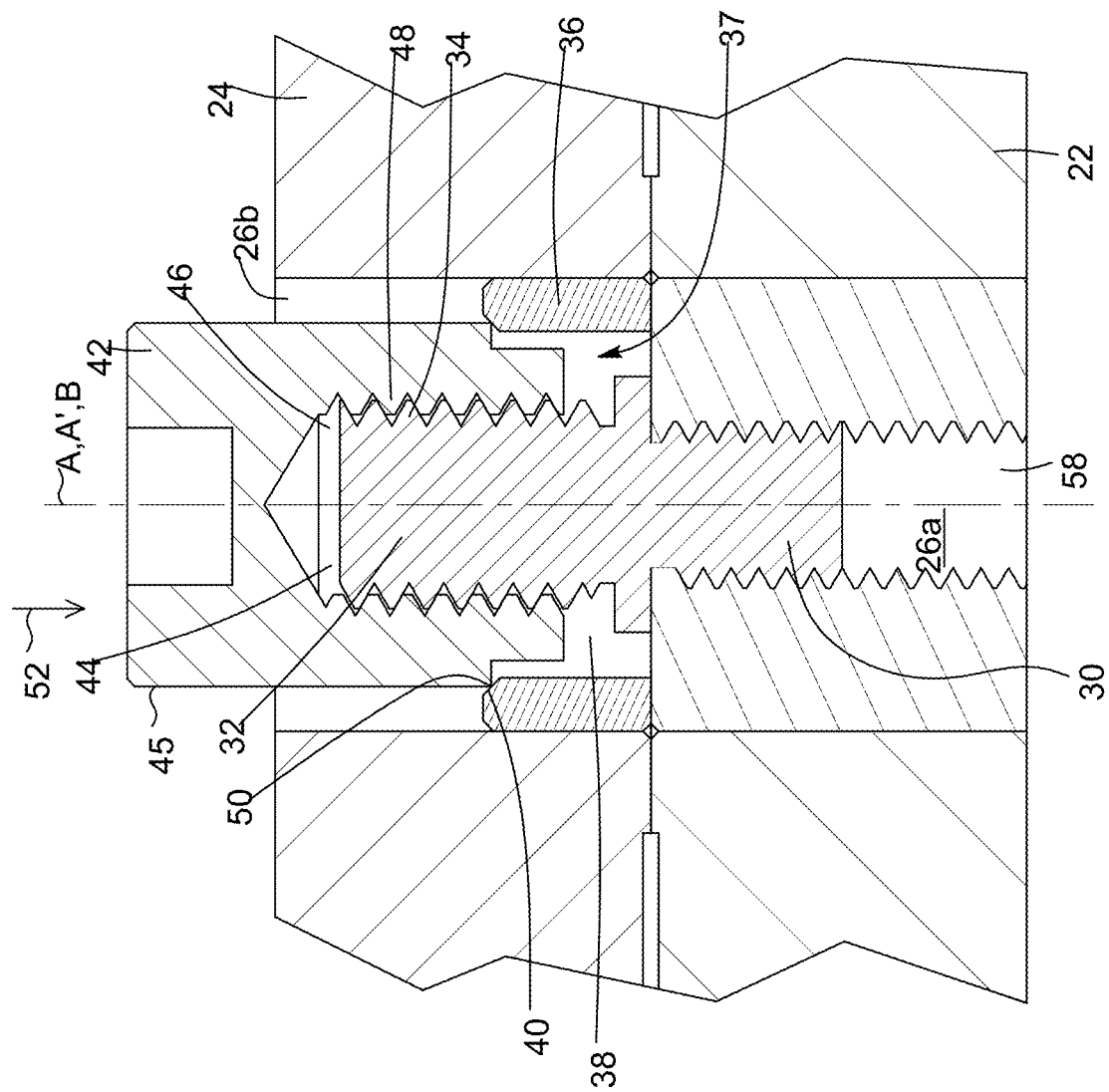

It will be readily understood that the precision positioning members may have a shape or configuration differing from the examples shown and explained above. By way of example, referring to FIG. 10 there is shown one variant where the positioning sleeve 36 is an integral part of the removable component 24. This may for example be achieved by precision machining of the positioning hole 26b to incorporate the abutment 40 inside the cavity. Referring to FIG. 11, there is shown another example where the assembly does not include a separate piece embodying the positioning stud, and the positioning shaft 32 is formed integrally to the reference component 22. Again, precision machining may be used for this purpose. FIG. 12 illustrates another variant including both a positioning sleeve 36 integral to the removable component 24 and a positioning shaft 32 projecting integrally from the reference component 22. Finally, referring to FIG. 13, in yet another variant the positioning stud 28 may have a threaded base 30 which may be screwed within a corresponding threaded cavity 58 provided for this purpose in the reference component 22.

Locking of the Clocking Angle

Referring back to FIGS. 3 and 3A, as one skilled in the art will readily understand, precisely aligning two axes with respect to each other leaves an uncontrolled degree of freedom between the two components, sometimes referred to as the clocking angle, that is, the relative position of the components with respect to the center axis B of the positioning shaft. Stated otherwise, once both reference 22 and removable 24 components are properly positioned so that the longitudinal axes A and A' of the holes 26a, 26b coincide with the center axis B, both components can still rotate one relative to the other, about the center axis B. As mentioned above, the assembly therefore preferably includes a clocking angle lock for locking a relative orientation of the reference component and removable component about the positioning shaft.

The clocking angle lock may be embodied by any suitable mechanism known in the art, and may for example include pins, clamps, and the like. In some implementations, the reference component 22 includes a clocking hole 126a extending therein or therethrough, and the clocking angle lock includes a set of clocking members provided in conjunction with the clocking hole 126a. In some variants, the removable component 24 also includes a clocking hole 126b of the same or similar diameter as that of the clocking hole 126a. Both clocking holes 126a, 126b are located on the respective component 22, 24 such that they are in alignment with each other when the reference and removable components 22, 24 are in the desired clocking orientation.

Figure 3C:
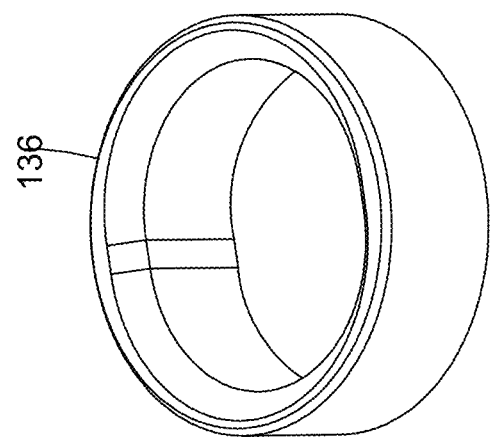
FIGS. 3B and 3C are perspective views of the positioning sleeve and clocking sleeve of the assembly of FIG. 3.
Figure 3B:
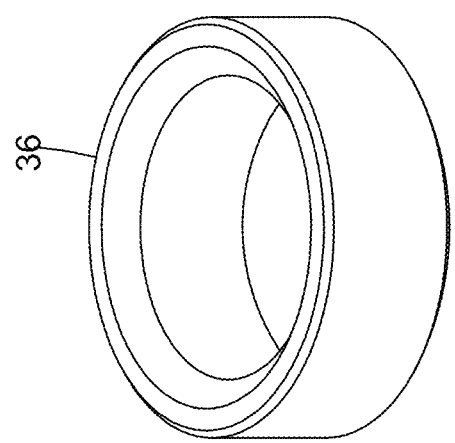
Figure 14B:
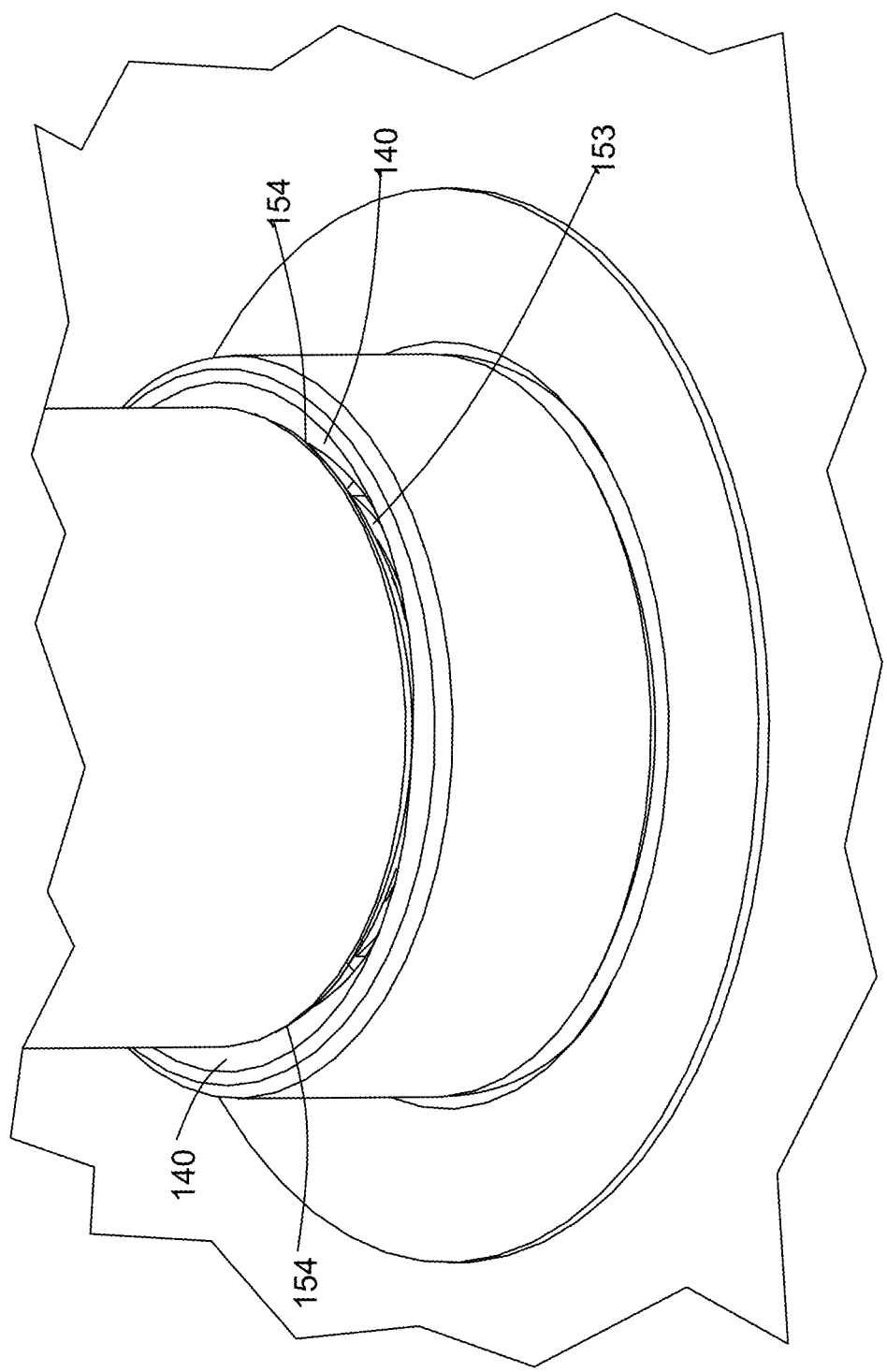
Figure 14C:
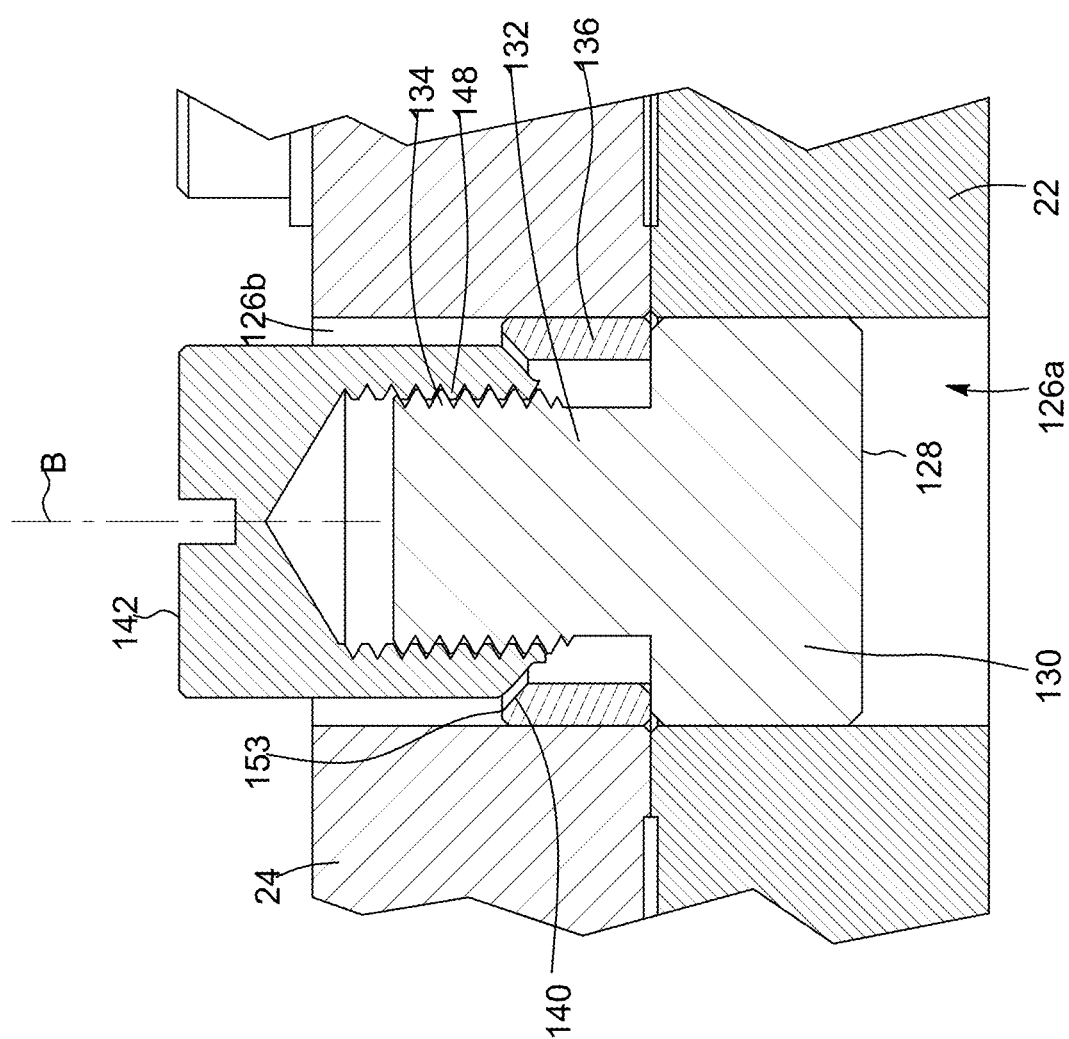

In some embodiments, the design of the clocking members provided in the clocking holes 126a, 126b of the reference component 22 and removable component 24 may be similar to that of the positioning members provided in the positioning holes 26a, 26b. Referring to FIGS. 14A to 14C, in one example the assembly therefore includes a clocking stud 128 comprising a cylindrical base 130 affixed in the clocking hole 126a of the reference component 22 and a clocking shaft 132 projecting therefrom and provided with clocking shaft threads 134. Alternatively, similarly to one embodiment described above with respect to the precision positioning members, the clocking shaft 132 may be provided with a threaded base screwed within the reference component 22. A slotted sleeve 136 extends in the clocking hole 126b of the removable component 24. The set of clocking members finally includes a clocking nut 142 having clocking nut threads 148 complementary with the clocking shaft threads 134, the clocking nut 142 being threadably engaged with the clocking shaft 132. The clocking stud 128, slotted sleeve 136 and clocking nut 142 may have characteristics similar to those of the positioning stud 28, positioning sleeve 36 and alignment nut 42, respectively. However, the clocking sleeve 136 has a surface 140 which is non-circular within a plane perpendicular to the center axis B, defining two opposite contact points 151a and 151b. The clocking nut 142 has an abutment 150 engaging the non-circular surface of the slotted sleeve 136 at these two opposite contact points 151a and 151b. The engagement 154 between the clocking nut 142 and the clocking sleeve 136 therefore occurs only at the contact points 151a and 151b. The profile of the surface 150 at the contact points meets an auto-alignment condition with the thread profile of the clocking shaft threads 132 and clocking nut threads 148 as defined above. In other words, the thread angle of the clocking shaft threads 134 and the spatial profile of at least one of the non-circular surface 150 of the slotted sleeve 136 at the opposite contact points 151a and 151b and the abutment 150 of the clocking nut 142 provide an automatic alignment of the clocking shaft 134 within the slotted sleeve 136. The three-dimensional profiles of the positioning sleeve 36 and clocking sleeve 136 can be compared on FIGS. 3B and 3C. When the clocking nut 142 is screwed onto the clocking shaft 132, it reaches the end of its course when the contact points 151a and 151b abut on the surface 140 of the slotted sleeve 136, leaving a space 153 between the remainder of the surface 140 and the abutment 150 of the clocking nut 142. This has the advantage of locking the clocking degree of freedom while avoiding any constraint on the assembly in the case where the distance between the positioning holes of the reference and removable components would have a manufacturing error, which would result in a loss of repeatability. The orientation of the removable component 24 with respect to the reference component 22 is therefore locked in place. As mentioned above with respect to the positioning nut 42, the clocking nut 142 may be left in place or may be removed and stored for future use after the assembly has been secured.

In some implementations, either the spatial profile of the non-circular surface 140 of the slotted sleeve 136 at the opposite contact points 151a and 151b or the abutment 150 of the clocking nut 142 is a frustro-spherical profile defined by a radius of curvature R' this radius of curvature meeting an auto-alignment condition defined by the equation:

$$R' = \sqrt{\left[\frac{d'_{nut}}{2\tan(\varphi'_{threads}/2)} - h' - T'/2\right]^2 + Y'^2} \quad (6)$$

where:
- $d'_{nut}$ is a diameter of the clocking nut 142 along the clocking nut threads 148;
- $\varphi'_{thread}$ is a value of the thread angle of the clocking shaft threads 134;
- Y' is a half-diameter of a contact line between the non-circular surface 140 of the slotted sleeve 136 and the abutment 150 of the clocking nut 142;
- h' is a longitudinal distance between (i) a first point of contact of the clocking nut threads 148 with the clocking shaft threads 134 proximate to the engagement of the slotted sleeve 136 and clocking nut 142 and (ii) a point of contact of the non-circular surface 140 of the slotted sleeve 136 with the abutment 150 of the clocking nut 142; and
- T' is a distance between (i) the first point of contact of the clocking nut threads 148 with the clocking shaft threads 134 proximate to the engagement of the slotted sleeve 136 and the clocking nut 142 and (ii) a last point of contact of the clocking nut threads 148 with the clocking shaft threads 134 farthest from the slotted sleeve 136 and diametrically opposite to the first point of contact.

In other implementations, either the spatial profile of the non-circular surface 140 of the slotted sleeve 136 at the opposite contact points 151a and 151b or the abutment 150 of the clocking nut 142 is a frustro-conical profile defined by an inclination angle α' with respect to a transversal plane, this inclination angle meeting an auto-alignment condition defined by the equation:

$$\alpha' = \sin^{-1}\left(\frac{Y'}{\sqrt{\left[\frac{(d')_{nut}}{2\tan(\varphi'_{threads}/2)} - h' - T'/2\right]^2 + Y'^2}}\right) \quad (7)$$

where:
- Y' is a half-diameter of a contact line between the non-circular surface 140 of the slotted sleeve 136 and the abutment 150 of the clocking nut 142;
- $d'_{nut}$ is a diameter of the clocking nut 142 along the clocking nut threads 148;

φ'$_{thread}$ is a value of the thread angle of the clocking shaft threads 134;

h' is a longitudinal distance between (i) a first point of contact of the clocking nut threads 148 with the clocking shaft threads 134 proximate to the engagement of the slotted sleeve 136 and clocking nut 142 and (ii) a point of contact of the non-circular surface 140 of the slotted sleeve 136 with the abutment 150 of the clocking nut 142; and T' is a distance between (i) the first point of contact of the clocking nut threads 148 with the clocking shaft threads 134 proximate to the engagement of the slotted sleeve 136 and the clocking nut 142 and (ii) a last point of contact of the clocking nut threads 148 with the clocking shaft threads 134 farthest from the slotted sleeve 136 and diametrically opposite to the first point of contact.

Kinematic Coupling Assembly

Figure 15:
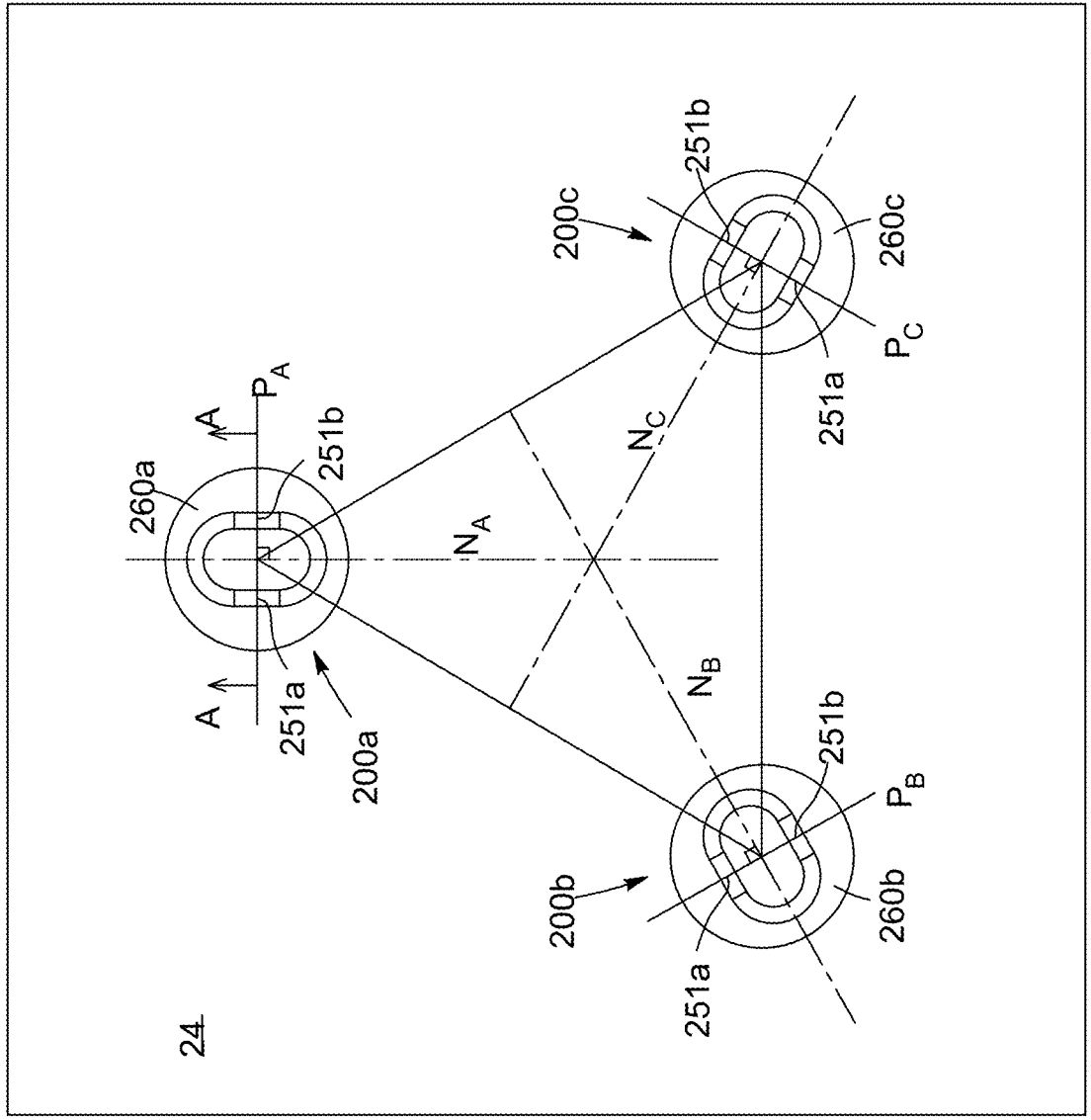
FIGS. 15 and 15A shows another variant using three sets of precision clocking members.
Figure 15A:
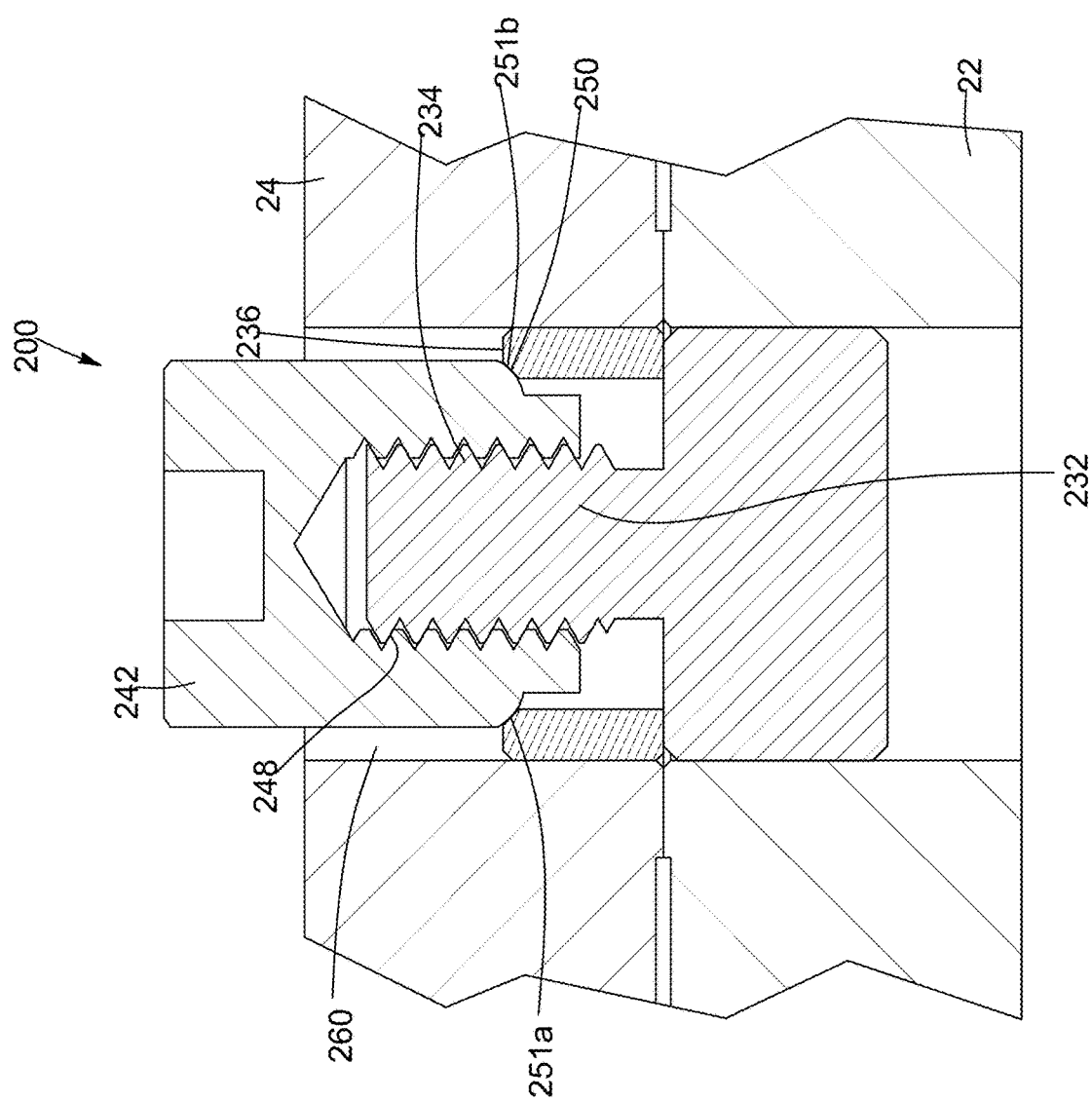

In the embodiments described above, the translational degrees of freedom of the removable component with respect to the reference component in the plane perpendicular to the center axis B are blocked by the precision positioning members, whereas the rotational degree of freedom with respect to the center axis B is blocked by the precision clocking members. With reference to FIGS. 15 and 15A, there is shown one embodiment wherein the repeatable positioning of the removable component is achieved using three sets of precision members 200a, 200b and 200c each similar to the precision clocking members described above, which collectively lock the translational and rotational degrees of freedom. In this variant, the removable component 24 is provided with three precision holes 260a, 260b and 260c therethrough. Each set of precision clocking members 200 may be as shown and described with respect to the embodiment of FIGS. 14A to 14C. In some implementations, each set of precision locking members 200 therefore includes a shaft 232 projecting from the reference component 22 and provided with shaft threads 234. A slotted sleeve 236 extends within the corresponding precision hole 260 of the removable component 24 and receiving the shaft 232 therethrough. The slotted sleeve 236 has a non-circular surface within a plane perpendicular to a center axis thereof and defining two opposite contact points 251a and 251b. Each set of precision locking members 200 further includes a corresponding nut 242 having nut threads 248 complementary with the shaft threads 234. The nut is threadably engaged with the shaft 232 and includes an abutment 250 engaging the non-circular surface of the slotted sleeve 236 at the two opposite contact points 251a and 251b. The thread angle of the shaft threads 234 and the spatial profile of at least one of the non-circular surface of the slotted sleeve 236 at the opposite contact points 251a and 251b and the abutment 250 of the nut 242 provide an automatic alignment of the shaft 232 within the slotted sleeve 236.

The sets of precision locking members 200a, 200b and 200c collectively lock all translational and rotational degrees of freedom of the removable component 24 with respect to the reference component 22, thereby providing a repeatable positioning of the removable component 24 at the target relative position. As shown in FIG. 15, the three sets of precision locking members 200a, 200b and 200c are preferably respectively oriented so that the normals N$_A$, N$_B$ and N$_C$ to planes P$_A$, P$_B$ and P$_C$ containing the center axis and contact points 251a, 251b of each set of precision locking members 200a, 200b, 200c bisect the angles between the sets of locking members. Other orientations or configurations could be envisioned, based on the principles of kinematic coupling.

Kit for Providing the Repeatable Positioning of a Removable Component with Respect to a Reference Component As one skilled in the art will readily understand, components of the assemblies presented above or of variants thereof may be provided in a kit format. Such a kit may for example be provided to manufacturers or end users of mechanical or opto-mechanical assemblies who otherwise made or acquired the reference component and removable component to be assembles together at a repeatable relative position. The reference component and removable component may each including one or more positioning hole and one or more clocking hole therethrough, or the kit acquirer may be provided with instructions to manufacture such holes according to predetermined dimensions and precision.

In some implementations, the kit includes at least one set of precision positioning members. Each set of precision members includes a positioning shaft provided with positioning shaft threads and configured to be rigidly affixed within one of the at least one positioning hole of the reference component so as to project therefrom. In some variants, each set of precision positioning members includes a positioning stud having a cylindrical base configured to be rigidly affixed within one of the positioning holes of the reference component, the positioning stud further including the positioning shaft projecting concentrically from the cylindrical base. In other variants, the positioning shaft may have a threaded base configured to be screwed within the reference component, the positioning holes on this variant defining threaded cavities complementary with the threaded base of the positioning shaft.

Each set of precision member further includes a positioning sleeve configured to be rigidly affixed within one of the at least one positioning hole of the removable component, the positioning sleeve defining an abutment. An alignment nut having alignment nut threads complementary with the positioning shaft threads is also provided. The alignment nut is threadedly engageable with the positioning shaft and having an abutment engageable with the abutment of the positioning sleeve.

In accordance with the principles described above, the spatial profile of at least one of the abutments and the thread angle of the positioning shaft threads are selected to provide an automatic alignment of the positioning shaft within the positioning sleeve. In some implementations this spatial profile may be a frustro-spherical profile defined by a radius of curvature R of the corresponding abutment such as defined by either equation (1) or equation (4). In other variants, This spatial profile may be a frustro-conical profile defined by an inclination angle α of the corresponding abutment with respect to a transversal plane, such as defined by equation (3). It will be readily understood that in some variant it is the abutment of the positioning sleeve that has the spatial profile providing an automatic alignment of the positioning shaft within the positioning sleeve, whereas in other variants, this spatial profile is on the abutment of the alignment nut.

The kit further includes at least one set of precision clocking members. Each set of precision clocking members includes a clocking shaft provided with clocking shaft threads and configured to be rigidly affixed within one of the at least one clocking hole of the reference component so as to project therefrom. In some variants, each set of precision clocking members includes a clocking stud having a cylindrical base configured to be rigidly affixed within one of the at least one clocking hole of the reference component, the clocking stud further including the clocking shaft projecting concentrically from the cylindrical base. In other variants, the clocking shaft may have a threaded base configured to be screwed within the reference component, the clocking holes on this variant defining threaded cavities complementary with the threaded base of the clocking shaft.

Each set of precision clocking members further includes a slotted sleeve configured to be rigidly affixed within one of the at least one clocking hole of the removable component. The slotted sleeve has a non-circular surface within a plane perpendicular to a center axis thereof and defining two opposite contact points. Each set of precision clocking member finally includes a clocking nut having clocking nut threads complimentary with the clocking shaft threads, the clocking nut being threadably engageable with the clocking shaft of the clocking stud and including an abutment engageable with the non-circular surface of the slotted sleeve at the two opposite contact points.

Again, in accordance with the principles described above, the thread angle of the clocking shaft threads and the spatial profile of at least one of the non-circular surface of the slotted sleeve at the opposite contact points and the abutment of the clocking nut are selected to provide an automatic alignment of the clocking shaft within the slotted sleeve. In some implementations this spatial profile may be a frustro-spherical profile defined by a radius of curvature R' such as defined by equation (6). In other variants, this spatial profile may be a frustro-conical profile defined by an inclination angle α' such as defined by equation (7). It will be readily understood that in some variant it is the slotted sleeve the slotted sleeve at the opposite contact points that has the spatial profile providing an automatic alignment of the clocking shaft within the slotted sleeve, whereas in other variants, this spatial profile is on the abutment of the clocking nut.

Advantageously, a given kit may include any number of sets of precision positioning members and precision clocking members as required for the intended use. The kit may include a different number of sets of precision positioning members and precision clocking members. Spare components of either type of sets may be provided separately or as part of the kit.

Of course, numerous modifications could be made to the embodiments described above without departing from the scope of protection.

The invention claimed is:
1. An assembly, comprising:
a reference component;
a removable component having a positioning hole therethrough and being removably assembled with the reference component at a target relative position;
a set of precision positioning members providing a repeatable positioning of the removable component at the target relative position, comprising:
 a positioning shaft projecting from the reference component and provided with positioning shaft threads;
 a positioning sleeve extending within the positioning hole of the removable component and receiving the positioning shaft therethrough, the positioning sleeve defining an abutment; and
 an alignment nut having alignment nut threads complementary with the positioning shaft threads, the alignment nut being threadedly engaged with the positioning shaft and having an abutment engaging the abutment of the positioning sleeve;
wherein a spatial profile of at least one of the abutments and a thread angle of the positioning shaft threads are selected to provide an automatic alignment of the positioning shaft within the positioning sleeve; and
a clocking angle lock for locking a relative orientation of the reference component and removable component about said positioning shaft.

2. The assembly according to claim 1, wherein the spatial profile of the at least one of the abutments is a frustro-spherical profile defined by a radius of curvature R of the corresponding abutment, said radius of curvature meeting an auto-alignment condition defined by the equation:

$$R = \sqrt{\left[\frac{d_{nut}}{2\tan(\varphi_{threads}/2)} - h - T/2\right]^2 + Y^2}$$

where:
$d_{nut}$ is a diameter of the alignment nut along the alignment nut threads;
$\varphi_{thread}$ is a value of the thread angle of the positioning shaft threads;
Y is a half-diameter of a contact line between the abutments of the positioning sleeve and the alignment nut;
h is a longitudinal distance between (i) a first point of contact of the alignment nut threads with the positioning shaft threads proximate to the abutments of the positioning sleeve and alignment nut and (ii) a point of contact of the abutment of the positioning sleeve with the abutment of the alignment nut; and
T is a distance between (i) the first point of contact of the alignment nut threads with the positioning shaft threads proximate to the abutments of the positioning sleeve and the alignment nut and (ii) a last point of contact of the alignment nut threads with the positioning shaft threads farthest from the positioning sleeve and diametrically opposite to the first point of contact.

3. The assembly according to claim 1, wherein the spatial profile of one of the abutments is a frustro-conical profile defined by an inclination angle α of the corresponding abutment with respect to a transversal plane, said inclination angle meeting an auto-alignment condition defined by the equation:

$$\alpha = \sin^{-1}\left(\frac{Y}{\sqrt{\left[\frac{d_{nut}}{2\tan(\varphi_{threads}/2)} - h - T/2\right]^2 + Y^2}}\right)$$

where:
Y is a half-diameter of a contact line between the abutments of the positioning sleeve and the alignment nut;
$d_{nut}$ is a diameter of the alignment nut along the alignment nut threads;
$\varphi_{thread}$ is a value of the thread angle of the positioning shaft threads;
h is a longitudinal distance between (i) a first point of contact of the alignment nut threads with the positioning shaft threads proximate to the abutments of the positioning sleeve and alignment nut and (ii) a point of contact of the abutment of the positioning sleeve with the abutment of the alignment nut; and
T is a distance between (i) the first point of contact of the alignment nut threads with the positioning shaft threads proximate to the abutments of the positioning sleeve and the alignment nut and (ii) a last point of contact of the alignment nut threads with the positioning shaft threads farthest from the positioning sleeve and diametrically opposite to the first point of contact.

4. The assembly according to any claim 1, wherein the abutment of the positioning sleeve has said spatial profile providing an automatic alignment of the positioning shaft within the positioning sleeve.

5. The assembly according to claim 1, wherein the abutment of the alignment nut has said spatial profile providing an automatic alignment of the positioning shaft within the positioning sleeve.

6. The assembly according to claim 1, wherein the reference component comprises a positioning hole therethrough, and the set of precision positioning members comprises a positioning stud including a cylindrical base rigidly affixed within the positioning hole of the reference component, the positioning stud further comprising said positioning shaft projecting concentrically from the cylindrical base.

7. The assembly according to claim 1, wherein the positioning shaft projects integrally from the reference component.

8. The assembly according to claim 1, wherein the positioning shaft comprises a threaded base screwed into the reference component.

9. The assembly according to claim 1, wherein the positioning sleeve is rigidly affixed within the positioning hole of the removable component.

10. The assembly according to claim 1, wherein the positioning sleeve is an integral part of the removable component.

11. The assembly according to claim 1, wherein the removable component comprises a clocking hole therethrough, the clocking angle lock comprising a set of clocking members provided in conjunction with the clocking hole, the set of clocking members comprising:
a clocking shaft projecting from the reference component and provided with clocking shaft threads;
a slotted sleeve extending within the clocking hole of the removable component and receiving the clocking shaft therethrough, the slotted sleeve having a non-circular surface within a plane perpendicular to a center axis thereof and defining two opposite contact points; and
a clocking nut having clocking nut threads complementary with the clocking shaft threads, the clocking nut being threadably engaged with the clocking shaft and including an abutment engaging the non-circular surface of the slotted sleeve at said two opposite contact points;
wherein a thread angle of the clocking shaft threads and a spatial profile of at least one of the non-circular surface of the slotted sleeve at said opposite contact points and the abutment of the clocking nut provide an automatic alignment of the clocking shaft within the slotted sleeve.

12. The assembly according to claim 11, wherein the spatial profile of the at least one of the non-circular surface of the slotted sleeve at said opposite contact points and the abutment of the clocking nut is a frustro-spherical profile defined by a radius of curvature R', said radius of curvature meeting an auto-alignment condition defined by the equation:

$$R' = \sqrt{\left[\frac{d'_{nut}}{2\tan(\varphi'_{threads}/2)} - h' - T'/2\right]^2 + Y'^2}$$

where:
D'$_{nut}$ is a diameter of the clocking nut along the clocking nut threads;
$\varphi'_{thread}$ is a value of the thread angle of the clocking shaft threads;
Y' is a half-diameter of a contact line between the non-circular surface of the slotted sleeve and the abutment of the clocking nut;
H' is a longitudinal distance between (i) a first point of contact of the clocking nut threads with the clocking shaft threads proximate to the engagement of the slotted sleeve and clocking nut and (ii) a point of contact of the non-circular surface of the slotted sleeve with the abutment of the clocking nut; and
T' is a distance between (i) the first point of contact of the clocking nut threads with the clocking shaft threads proximate to the engagement of the slotted sleeve and the clocking nut and (ii) a last point of contact of the clocking nut threads with the clocking shaft threads farthest from the slotted sleeve and diametrically opposite to the first point of contact.

13. The assembly according to claim 11, wherein the spatial profile of the at least one of the non-circular surface of the slotted sleeve at said opposite contact points and the abutment of the clocking nut is a frustro-conical profile defined by an inclination angle α' with respect to a transversal plane, said inclination angle meeting an auto-alignment condition defined by the equation:

$$\alpha' = \sin^{-1}\left(\frac{Y'}{\sqrt{\left[\frac{d'_{nut}}{2\tan(\varphi'_{threads}/2)} - h' - T'/2\right]^2 + Y'^2}}\right)$$

where:
Y' is a half-diameter of a contact line between the slotted sleeve and the clocking nut;
d'$_{nut}$ is a diameter of the clocking nut along the clocking nut threads;
$\varphi'_{thread}$ is a value of the thread angle of the clocking shaft threads;
h' is a longitudinal distance between (i) a first point of contact of the clocking nut threads with the clocking shaft threads proximate to the engagement of the slotted sleeve and clocking nut and (ii) a point of contact of the non-circular surface of the slotted sleeve with the abutment of the clocking nut; and
T' is a distance between (i) the first point of contact of the clocking nut threads with the clocking shaft threads proximate to the engagement of the slotted sleeve and the clocking nut and (ii) a last point of contact of the clocking nut threads with the clocking shaft threads farthest from the slotted sleeve and diametrically opposite to the first point of contact.

14. An assembly, comprising:
a reference component;
a removable component removably assembled with the reference component at a target relative position, the removable component being provided with three precision holes therethrough;
three sets of precision members each associated with a corresponding one of said locking precision holes of the removable component, each set of precision members comprising:
a shaft projecting from the reference component and provided with shaft threads;

a slotted sleeve extending within the corresponding precision hole of the removable component and receiving the shaft therethrough, the sleeve having a non-circular surface within a plane perpendicular to a center axis thereof and defining two opposite contact points; and a nut having nut threads complementary with the shaft threads, the nut being threadably engaged with the shaft and including an abutment engaging the non-circular surface of the slotted sleeve at said two opposite contact points;

wherein a thread angle of the shaft threads and a spatial profile of at least one of the non-circular surface of the slotted sleeve at said opposite contact points and the abutment of the nut provide an automatic alignment of the shaft within the slotted sleeve; and wherein the sets of precision locking members collectively lock all translational and rotational degrees of freedom of the removable component with respect to the reference component, thereby providing a repeatable positioning of the removable component at the target relative position.

15. The assembly according to claim 14, wherein the three sets of locking members are respectively oriented so that normals $N_A$, $N_B$ and $N_C$ to planes $P_A$, $P_B$ and $P_C$ containing the center axis and contact points of each set of precision locking members bisect an angle between the sets of precision locking members.

16. The assembly according to claim 14, wherein, for each set of precision locking members, the spatial profile of the at least one of the non-circular surface of the slotted sleeve at said opposite contact points and the abutment of the nut is a frustro-spherical profile defined by a radius of curvature R', said radius of curvature meeting an auto-alignment condition defined by the equation:

$$R' = \sqrt{\left[\frac{d'_{nut}}{2\tan(\varphi'_{threads}/2)} - h' - T'/2\right]^2 + Y'^2}$$

where:
$d'_{nut}$ is a diameter of the nut along the nut threads;
$\varphi'_{thread}$ is a value of the thread angle of the shaft threads;
Y' is a half-diameter of a contact line between the non-circular surface of the slotted sleeve and the abutment of the nut;
h' is a longitudinal distance between (i) a first point of contact of the nut threads with the shaft threads proximate to the engagement of the slotted sleeve and clocking nut and (ii) a point of contact of the non-circular surface of the slotted sleeve with the abutment of the nut; and
T' is a distance between (i) the first point of contact of the nut threads with the shaft threads proximate to the engagement of the slotted sleeve and the nut and (ii) a last point of contact of the nut threads with the shaft threads farthest from the slotted sleeve and diametrically opposite to the first point of contact.

17. The assembly according to claim 14, wherein, for each set of precision locking members, the spatial profile of the at least one of the non-circular surface of the slotted sleeve at said opposite contact points and the abutment of the nut is a frustro-conical profile defined by an inclination angle α' with respect to a transversal plane, said inclination angle meeting an auto-alignment condition defined by the equation:

$$\alpha' = \sin^{-1}\left(\frac{Y'}{\sqrt{\left[\frac{d'_{nut}}{2\tan(\varphi'_{threads}/2)} - h' - T'/2\right]^2 + Y'^2}}\right)$$

where:
Y' is a half-diameter of a contact line between the slotted sleeve and the nut;
$d'_{nut}$ is a diameter of the nut along the nut threads;
$\varphi'_{thread}$ is a value of the thread angle of the shaft threads;
h' is a longitudinal distance between (i) a first point of contact of the nut threads with the shaft threads proximate to the engagement of the slotted sleeve and nut and (ii) a point of contact of the non-circular surface of the slotted sleeve with the abutment of the nut; and
T' is a distance between (i) the first point of contact of the nut threads with the shaft threads proximate to the engagement of the slotted sleeve and the nut and (ii) a last point of contact of the nut threads with the shaft threads farthest from the slotted sleeve and diametrically opposite to the first point of contact.

18. A kit for providing the repeatable positioning of a removable component with respect to a reference component, the reference component and removable component each including at least one positioning hole and at least one clocking hole therethrough, said kit comprising:

at least one set of precision positioning members, each comprising:
a positioning shaft provided with positioning shaft threads and configured to be rigidly affixed within one of the at least one positioning hole of the reference component so as to project therefrom;
a positioning sleeve configured to be rigidly affixed within one of the at least one positioning hole of the removable component, the positioning sleeve defining an abutment; and
an alignment nut having alignment nut threads complementary with the positioning shaft threads, the alignment nut being threadedly engageable with the positioning shaft and having an abutment engageable with the abutment of the positioning sleeve;
wherein a spatial profile of at least one of the abutments and a thread angle of the positioning shaft threads are selected to provide an automatic alignment of the positioning shaft within the positioning sleeve; and at least one set of precision clocking members, each comprising:
a clocking shaft provided with clocking shaft threads and configured to be rigidly affixed within one of the at least one clocking hole of the reference component so as to project therefrom; and
a slotted sleeve configured to be rigidly affixed within one of the at least one clocking hole of the removable component, the slotted sleeve having a non-circular surface within a plane perpendicular to a center axis thereof and defining two opposite contact points; and
a clocking nut having clocking nut threads complimentary with the clocking shaft threads, the clocking nut being threadably engageable with the clocking shaft and including an abutment engageable with the non-circular surface of the slotted sleeve at said two opposite contact points;
wherein a thread angle of the clocking shaft threads and a spatial profile of at least one of the non-circular surface of the slotted sleeve at said opposite contact points and the abutment of the clocking nut are selected to provide an automatic alignment of the clocking shaft within the slotted sleeve.

19. The kit according to claim 18, wherein, for each of the at least one set of positioning members, the spatial profile of the at least one of the abutments is a frustro-spherical profile defined by a radius of curvature R of the corresponding abutment, said radius of curvature meeting an auto-alignment condition defined by the equation:

$$R = \sqrt{\left[\frac{d_{nut}}{2\tan(\varphi_{threads}/2)} - h - T/2\right]^2 + Y^2}$$

where:
- $d_{nut}$ is a diameter of the alignment nut along the alignment nut threads;
- $\varphi_{thread}$ is a value of the thread angle of the positioning shaft threads;
- Y is a half-diameter of a contact line, in use, between the abutments of the positioning sleeve and the alignment nut;
- h is a longitudinal distance, in use, between (i) a first point of contact of the alignment nut threads with the positioning shaft threads proximate to the abutments of the positioning sleeve and alignment nut and (ii) a point of contact of the abutment of the positioning sleeve with the abutment of the alignment nut; and
- T is a distance, in use, between (i) the first point of contact of the alignment nut threads with the positioning shaft threads proximate to the abutments of the positioning sleeve and the alignment nut and (ii) a last point of contact of the alignment nut threads with the positioning shaft threads farthest from the positioning sleeve and diametrically opposite to the first point of contact.

20. The kit according to claim 18, wherein, for each of the at least one set of precision positioning members, the spatial profile of the at least one of the abutments is a frustro-conical profile defined by an inclination angle α of the corresponding abutment with respect to a transversal plane, said inclination angle meeting an auto-alignment condition defined by the equation:

$$\alpha = \sin^{-1}\left(\frac{Y}{\sqrt{\left[\frac{d_{nut}}{2\tan(\varphi_{threads}/2)} - h - T/2\right]^2 + Y^2}}\right)$$

where:
- Y is a half-diameter of a contact line, in use, between the abutments of the positioning sleeve and the alignment nut;
- $d_{nut}$ is a diameter of the alignment nut along the alignment nut threads;
- $\varphi_{thread}$ is a value of the thread angle of the positioning shaft threads;
- h is a longitudinal distance, in use, between (i) a first point of contact of the alignment nut threads with the positioning shaft threads proximate to the abutments of the positioning sleeve and alignment nut and (ii) a point of contact of the abutment of the positioning sleeve with the abutment of the alignment nut; and
- T is a distance, in use, between (i) the first point of contact of the alignment nut threads with the positioning shaft threads proximate to the abutments of the positioning sleeve and the alignment nut and (ii) a last point of contact of the alignment nut threads with the positioning shaft threads farthest from the positioning sleeve and diametrically opposite to the first point of contact.

21. The kit according to claim 18, wherein, for each of the at least one set of precision positioning members, the abutment of the positioning sleeve has said spatial profile providing an automatic alignment of the positioning shaft within the positioning sleeve.

22. The kit according to claim 18, wherein, for each of the at least one set of precision positioning members, the abutment of the alignment nut has said spatial profile providing an automatic alignment of the positioning shaft within the positioning sleeve.

23. The kit according to of claim 18, wherein, for each set of the at least one set of precision clocking members, the spatial profile of the at least one of the non-circular surface of the slotted sleeve at said opposite contact points and the abutment of the clocking nut is a frustro-spherical profile defined by a radius of curvature R', said radius of curvature meeting an auto-alignment condition defined by the equation:

$$R' = \sqrt{\left[\frac{d'_{nut}}{2\tan(\varphi'_{threads}/2)} - h' - T'/2\right]^2 + Y'^2}$$

where:
- $d'_{nut}$ is a diameter of the clocking nut along the clocking nut threads;
- $\varphi'_{thread}$ is a value of the thread angle of the clocking shaft threads;
- Y' is a half-diameter of a contact line, in use, between the non-circular surface of the slotted sleeve and the abutment of the clocking nut;
- h' is a longitudinal distance, in use, between (i) a first point of contact of the clocking nut threads with the clocking shaft threads proximate to the engagement of the slotted sleeve and clocking nut and (ii) a point of contact of the non-circular surface of the slotted sleeve with the abutment of the clocking nut; and
- T' is a distance, in use, between (i) the first point of contact of the clocking nut threads with the clocking shaft threads proximate to the engagement of the slotted sleeve and the clocking nut and (ii) a last point of contact of the clocking nut threads with the clocking shaft threads farthest from the slotted sleeve and diametrically opposite to the first point of contact.

24. The kit according to claim 18, wherein, for each of the at least one set of precision clocking members, the spatial profile of the at least one of the non-circular surface of the slotted sleeve at said opposite contact points and the abutment of the clocking nut is a frustro-conical profile defined by an inclination angle α' with respect to a transversal plane, said inclination angle meeting an auto-alignment condition defined by the equation:

$$\alpha' = \sin^{-1}\left(\frac{Y'}{\sqrt{\left[\frac{d'_{nut}}{2\tan(\varphi'_{threads}/2)} - h' - T'/2\right]^2 + Y'^2}}\right)$$

where:
- Y' is a half-diameter of a contact line, in use, between the slotted sleeve and the clocking nut;

$d'_{nut}$ is a diameter of the clocking nut along the clocking nut threads;

$\varphi'_{thread}$ is a value of the thread angle of the clocking shaft threads;

h' is a longitudinal distance, in use, between (i) a first point of contact of the clocking nut threads with the clocking shaft threads proximate to the engagement of the slotted sleeve and clocking nut and (ii) a point of contact of the non-circular surface of the slotted sleeve with the abutment of the clocking nut; and T' is a distance, in use, between (i) the first point of contact of the clocking nut threads with the clocking shaft threads proximate to the engagement of the slotted sleeve and the clocking nut and (ii) a last point of contact of the clocking nut threads with the clocking shaft threads farthest from the slotted sleeve and diametrically opposite to the first point of contact.

25. The kit according to claim 18, wherein each set of precision positioning members comprises a positioning stud including a cylindrical base configured to be rigidly affixed within one of the at least one positioning hole of the reference component, the positioning stud further comprising the positioning shaft projecting concentrically from the cylindrical base.

26. The kit according to claim 18, wherein each set of precision clocking members comprises a clocking stud including a cylindrical base configured to be rigidly affixed within one of the at least one clocking hole of the reference component, the clocking stud further comprising the clocking shaft projecting concentrically from the cylindrical base.

\* \* \* \* \*